(12) United States Patent
Thomas et al.

(10) Patent No.: US 12,556,725 B2
(45) Date of Patent: Feb. 17, 2026

(54) ADAPTIVE RESOLUTION CODING FOR VIDEO CODING

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Emmanuel Thomas, Delft (NL); Alexandre da Silva Pratas Gabriel, The Hague (NL); Emmanouil Potetsianakis, The Hague (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 18/259,562

(22) PCT Filed: Dec. 22, 2021

(86) PCT No.: PCT/EP2021/087206
§ 371 (c)(1),
(2) Date: Jun. 27, 2023

(87) PCT Pub. No.: WO2022/144262
PCT Pub. Date: Jul. 7, 2022

(65) Prior Publication Data
US 2024/0064317 A1    Feb. 22, 2024

(30) Foreign Application Priority Data
Dec. 29, 2020    (EP) .................................. 20217487

(51) Int. Cl.
H04N 19/33    (2014.01)
H04N 19/105    (2014.01)
(Continued)

(52) U.S. Cl.
CPC .......... *H04N 19/33* (2014.11); *H04N 19/105* (2014.11); *H04N 19/172* (2014.11);
(Continued)

(58) Field of Classification Search
CPC ......... H04N 19/39; H04N 19/59; H04N 19/80
See application file for complete search history.

(56) References Cited

U.S. PATENT DOCUMENTS 11,330,280 B2    5/2022  Da Silva Pratas Gabriel et al.
11,438,610 B2    9/2022  Da Silva Pratas Gabriel et al.
(Continued)

FOREIGN PATENT DOCUMENTS

WO    WO-2019197661 A1 *  10/2019  ........... G06T 3/4046
WO         2020185842 A1       9/2020

OTHER PUBLICATIONS

European Search Report for European Appl.. No. 20217487.6, Date Mailed: Jun. 16, 2021, 10 pages.
(Continued)

*Primary Examiner* — Jayanti K Patel
*Assistant Examiner* — Christopher Kingsbury Glover
(74) *Attorney, Agent, or Firm* — Hamilton, Brook, Smith & Reynolds, P.C.

(57) ABSTRACT

Decoding coded pictures of a video includes receiving, by a decoder apparatus, a bitstream comprising an encoded representation of first pictures of a first resolution version of the video and decoding the coded first pictures into first pictures, the first pictures being associated with corresponding second pictures of a second resolution version of the video, the first pictures being formed by sampling the corresponding second pictures using a sampling lattice. Signalling information received in the bitstream informs the decoder apparatus about a resolution change. The method includes identifying at least one of the first pictures as a first base picture and
(Continued)

identifying one or more auxiliary pictures, the first base picture being associated with a corresponding second picture, and, each of the one or more auxiliary pictures being formed based on sampling the second picture using a different sampling lattice of the plurality of sampling lattices. The method further includes receiving an encoded representation of the one or more auxiliary pictures in the bitstream, decoding the encoded representation of the one or more auxiliary pictures into one or more auxiliary pictures and constructing a reference picture of the second resolution based on the first base picture and the one or more auxiliary pictures. The method further includes receiving an encoded representation of second pictures in the bitstream and decoding at least part of the encoded representation of the second pictures into one or more second pictures using the constructed reference picture.

16 Claims, 13 Drawing Sheets

(51) Int. Cl.
  *H04N 19/169* (2014.01)
  *H04N 19/172* (2014.01)
  *H04N 19/176* (2014.01)
  *H04N 19/70* (2014.01)
  *H04N 19/80* (2014.01)

(52) U.S. Cl.
  CPC ......... *H04N 19/176* (2014.11); *H04N 19/188* (2014.11); *H04N 19/70* (2014.11); *H04N 19/80* (2014.11)

(56) References Cited

U.S. PATENT DOCUMENTS

| | | | |
|---|---|---|---|
| 2006/0015792 A1* | 1/2006 | Vitali | H04N 19/59 |
| | | | 375/E7.091 |
| 2006/0120290 A1* | 6/2006 | Della Torre | H04N 19/40 |
| | | | 375/E7.181 |
| 2022/0191543 A1* | 6/2022 | He | H04N 19/172 |

OTHER PUBLICATIONS

International Search Report and Written Opinion for Int'l Appl. No. PCT/EP2021/087206, Date Mailed: Apr. 19, 2022.

Samuelsson, S. et al., "AHG 8: Adaptive Resolution Change (ACR) with downsampling," 15th Meeting, JVET Meeting; Gothenburg, SE, 7 pages (Jul. 3-12, 2019).

Reibman et al., "Scalable Video Coding with managed drift," IEEE Transactions on Circuits and Systems for Video Technology 13(2), pp. 131-140 (Mar. 2003).

Sze et al., "High Efficiency Video Coding (HEVC)." Integrated Circuit and Systems, Algorithms and Architectures, Springer (2014): pp. 1-11 and 285-308, Section: 9.2.7 RD Optimization.

Roodaki, H., et al., "Efficient video resolution adaptation using scalable H.265/HEVC",, IEEE Transactions on Circuits and Systems for Video Technology, vol. 13, No. 2, Sep. 15-18, 2013, 5 pages.

* cited by examiner

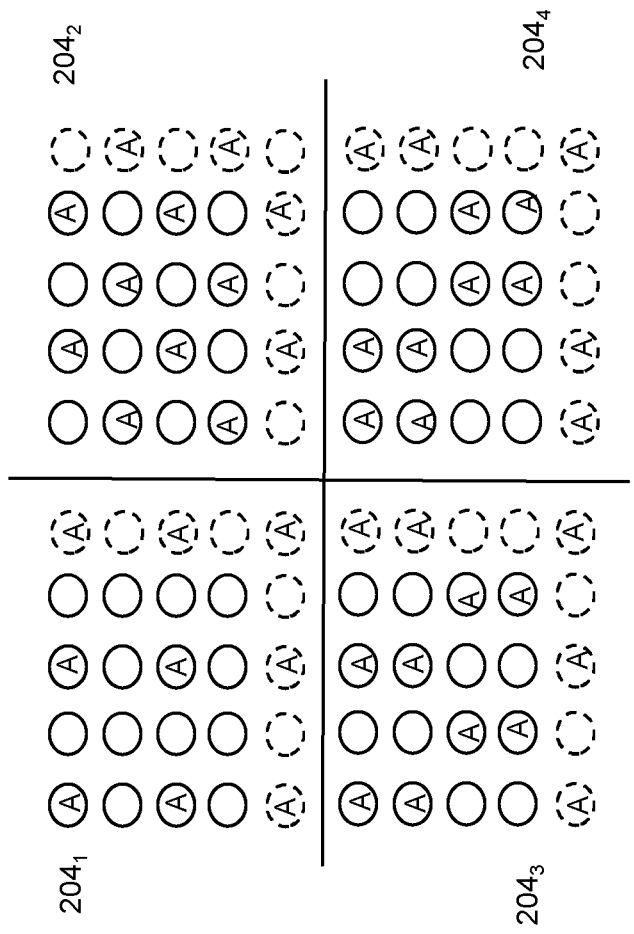
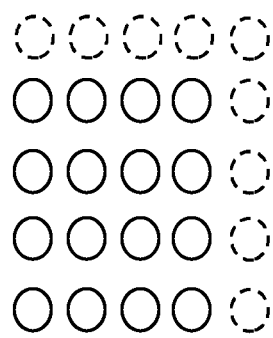
FIG. 2

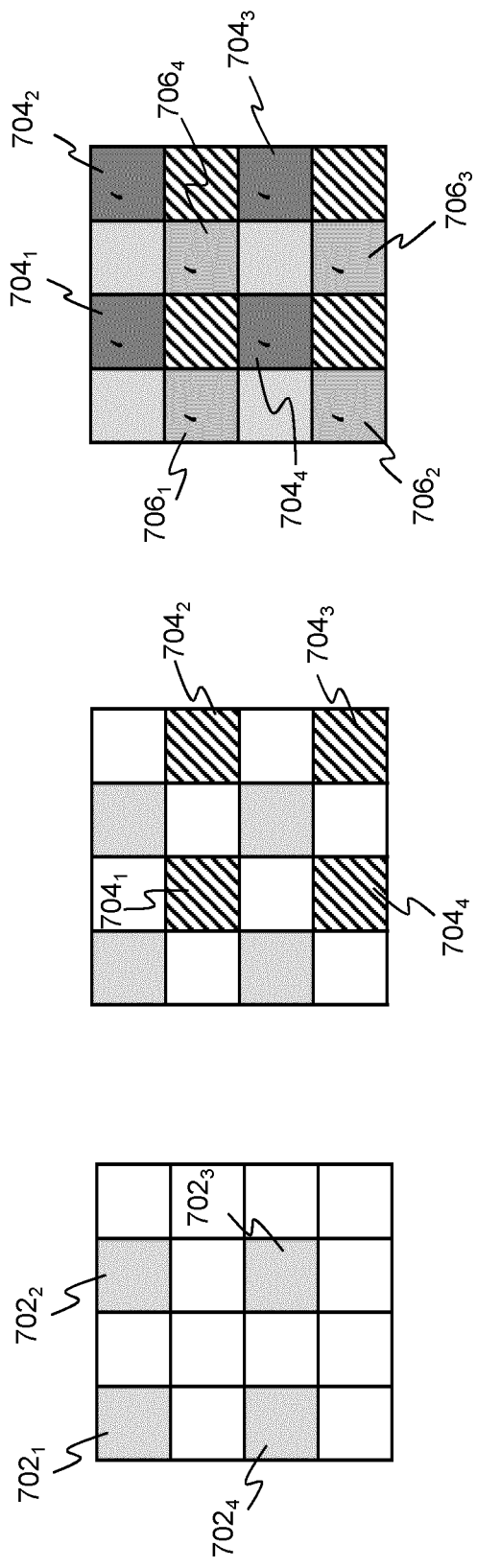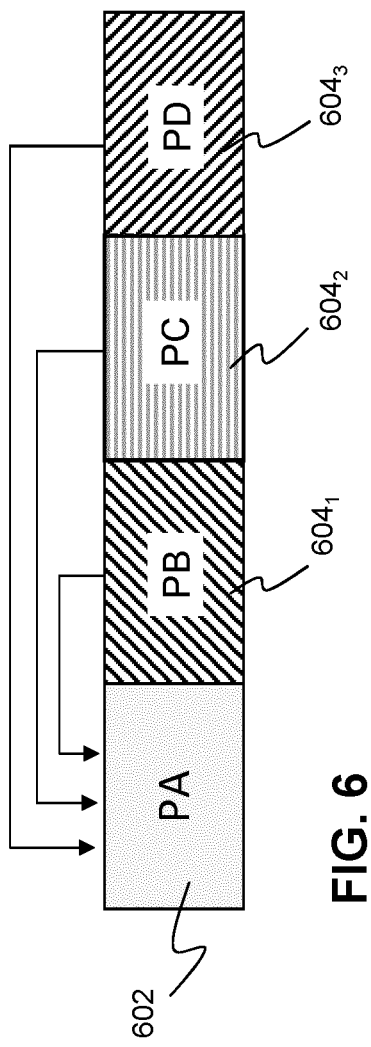

ADAPTIVE RESOLUTION CODING FOR VIDEO CODING

This application is the U.S. National Stage of International Application No. PCT/EP2021/087206, filed on Dec. 22, 2021, which designates the U.S., published in English, and claims priority under 35 U.S.C. § 119 or 365(c) to European Application No. 20217487.6, filed on Dec. 29, 2020. The entire teachings of the above applications are incorporated herein by reference.

FIELD OF THE INVENTION

The invention relates to adaptive resolution coding, and, in particular, though not exclusively, to methods and systems for adaptive resolution coding, a video decoder apparatus and a bitstream construction module using such methods and a computer program product for executing such methods.

BACKGROUND OF THE INVENTION

In video coding, the so-called adaptive resolution coding (ARC) schemes allow dynamic adaptation of resolution during video coding. For example, in the article by Roodaki et al., *Efficient Video Resolution Adaptation using scalable H.265/HEVC*, IEEE transactions on circuits and systems for video technology, vol. 13, no. 2, 20013, a scheme is proposed to enable efficient adaptive resolution changes for videoconferencing using the scalable extension of the H.265/HEVC standard (SHVC). Instead of using so-called Instantaneous Decoder Refresh (IDR) coded pictures as a resolution changing point in a sequence of pictures for changing the resolution during a video conferencing session, the proposed approach utilizes inter-layer-predicted (P) pictures of the low-resolution base layer as a reference frame to switch to the high-resolution enhancement layer. Since the scalable video coding inherently includes mechanisms for upsampling and inter-layer prediction, it can efficiently support the adaptive resolution change, for instance in use cases such as videoconferencing.

In order to support adaptively changing the resolution within the SHVC standard, the solution proposed requires that two indications need to be made at the decoder side. This first is to signal that inter-layer prediction is used only for resolution switching purposes as opposed to scalability purposes. The difference is that for scalability there would need to be a base and enhancement layer before and/or after the switch, but this is not the case. In this case the new layer is used to upscale and all remaining frames in the new layer, which would normally be an enhancement layer are the only layer. Secondly, it is necessary to indicate that each access unit (AU), i.e. each coded picture, in the sequence of pictures contains a single picture of a single layer with the switching point being the exception. This because at the point of the switch two AUs, corresponding to two different layers are used to output a picture, while the remaining pictures are all made up of one layer and one AU each. In SHVC when switching to an enhancement layer this is not possible as a base layer is still required and therefore must be signalled.

Generally, drift may occur in ARC when a high-resolution (low-resolution) frame no longer uses its original reference frame, but instead an upscaled (downscaled) version of a lower (higher) resolution version. As described in an article by Reibman et al, *Scalable Video Coding with managed drift*, IEEE Transactions on Circuits and Systems for Video Technology 13(2) March 2003, pp. 131-140, drift is a well-known error propagation phenomenon in video coding schemes. Reibman et al describes a system wherein the drift is intentionally caused by predicting a picture of the base layer based on a picture of the enhancement layer.

The above-described scheme proposed by Roodaki et al. works well for live-encoding schemes, or more generally in cases where an encoder is aware of or informed by the client about the switching point so that it can handle the encoding of the video data at the switching point. In such cases, when the client is requesting a switch in the resolution, the encoder will encode the content specifically for such resolution change. This means there is no drift as the decoder generates the decoded images bit exact as generated by the encoder. This way the same reference frames are used in both the encoder and decoder processes.

However, there are also encoder agnostic cases, wherein the encoder does not encode a resolution change, e.g. in case of video on demand content distribution, a client typically has access to a low-resolution stream and high-resolution stream. When the client decides to switch resolution at a random point in the decoding process, an upscaled inter-predicted low-resolution frame will be used as a reference so that drift will appear. Drift will appear because right after a resolution change to a high resolution, an inter-predicted frame in the high-resolution stream will us a reference frame for inter prediction that has been upscaled from the low-resolution stream which is stored in the decoded picture buffer of the decoder at the client side. This reference frame is not identical to the frame originally referenced by the high-resolution frame which explains the drift in the predicted sample values.

Hence, in the encoder agnostic case, when a client wants to switch resolution between two streams of two different resolution versions of the same content, the decoder typically has to wait until the next I frame (or IDR frame) in the stream in order to avoid drift, which will cause delay by the client from switching to a higher quality. Depending on the position of the switching point in the picture sequence structure, e.g. the GOP structure, waiting for an I frame may take a number of decoding cycles, thereby delaying the resolution switch. Alternatively, a relatively large I frame may be downloaded at the exact point a switch is desired thereby unnecessarily increasing the bandwidth. Therefore, the capability to switch at a random point in the stream without requiring an I frame (or an IDR frame) is desired.

Thus, while ARC schemes exist that allow a decoder to switch at points in a picture sequence structure which are not I frames, such schemes may incur a drift in the decoder because of the necessity of the generation of a high-resolution reference picture based on a lower-resolution picture. This causes the picture, that is used as a reference, to propagate errors into the oncoming frames which reference it. For systems where the encoder(s) are agnostic to switching points this is a problem as the visual quality may significantly deteriorate up to a point that ARC functionality cannot realistically be used in practical applications. Hence, from the above it follows there is a need in the art for improved video coding methods and video coding systems that allow improvement of upscaling when transitioning resolution using ARC.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Additionally, the Instructions may be executed by any type of processors, including but not limited to one or more digital signal processors (DSPs), general purpose microprocessors, application specific integrated circuits (ASICs), field programmable logic arrays (FP-GAs), or other equivalent integrated or discrete logic circuitry.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The embodiments in this application use of spatial sub-sampling schemes to create high- and low-resolution versions of a video, which can be used for efficient adaptive resolution changes at any point during a streaming session between a video source, e.g. a VOD system or a CDN, to a plurality of clients. Thus, the low-resolution version of the video is created based on subsampling a high-resolution video. This way, there is a one-to-one relation between the low- and high-resolution version. In other words, they have the same frame rate.

In an aspect, the invention relates to a method of decoding encoded representations of pictures of a first and second resolution version of a video by a decoder apparatus. In an embodiment, the method may include receiving a bitstream comprising encoded representations of first pictures of the first resolution version, the first pictures being subsampled versions of corresponding second pictures of the second resolution version, the subsampling being based on a first sampling lattice selected from a plurality of sampling lattices of a spatial subsampling scheme and decoding the encoded representations of the first pictures into first pictures. In an embodiment, the method may include receiving signalling information, preferably in the bitstream, the signalling information informing the decoder apparatus about a termination of receiving the encoded representations of the first pictures and the start of receiving of encoded representations of second pictures of the second resolution version. In an embodiment, the signalling information may further identify at least one of the first pictures of the first resolution version as a first base picture and selecting one or more auxiliary pictures, the first base picture being associated with a corresponding second picture of the second resolution version, and, each of the one or more auxiliary pictures being a subsampled version of the corresponding second picture of the second resolution version, the subsampling being based on one or more further sampling lattices of the plurality of sampling lattices. In an embodiment, the method may comprise receiving an encoded representation of the one or more auxiliary pictures in the bitstream, decoding the encoded representation of the one or more auxiliary pictures into one or more auxiliary pictures and constructing a reference picture of the second resolution version based on the first base picture and the one or more auxiliary pictures. The method may also include receiving an encoded representation of second pictures in the bitstream and decoding at least part of the encoded representation of the second pictures into one or more second pictures using the reference picture.

Hence, the invention enables a switch from decoding a low-resolution version of the video to decoding the high-resolution version of the video during a video streaming session at a position in the GOP that does not coincide with an I or IDR picture. It complements an incomplete GOP of high-res pictures with upsampled low-res pictures. The invention does this by sending auxiliary data to improve the drift that can occur when doing so, improving the reference frames when the decoder operates at a higher resolution. To that end, the low version of the video may be formed by sampling pictures of the high resolution using a sampling lattice of a plurality of sampling lattices of a spatial subsampling scheme. This way each low-resolution picture has a corresponding high-resolution picture. During a resolution change, a reference picture may be constructed based on a decoded low-resolution picture (a base picture) that was decoded before a resolution change was signalled resolution change and based on one or more coded low resolution auxiliary pictures (i.e. different subsampled versions of a high resolution picture that corresponds with the base picture) which are transmitted with the resolution change signal to the client. This way a reference picture may be constructed that allows more accurate decoding of high-resolution pictures that are received by the decoding apparatus after the resolution change. This way, a resolution change is realized without incurring a substantial drop in the video quality due to drift and without requiring transmission of an extra I frame or the like.

The invention is particular advantageous for coded video that have relatively long GOP structures, such as video on demand content. The invention allows resolution changes in such video without a quality drop. Hence, longer GOP structures can be used resulting in improved encoding efficiency while still allowing for resolution changes in case bandwidth fluctuates.

The creation of a bitstream that enable such resolution switching can be implemented in different ways. For example, the low-resolution stream may be stored on a media server configured to stream video to clients and the auxiliary pictures may be stored locally, e.g. at the client side, as a separate stream. The auxiliary pictures may comprise metadata associated such as byte ranges corresponding to each of the auxiliary pictures for each low-resolution frame. When a client is streaming the low-resolution stream, at the moment it decides to switch the client may, using the byte ranges, request the auxiliary pictures necessary. The client can then create a valid bitstream by parsing the NAL units and insert the requested auxiliary pictures at the correct moment.

In an embodiment, at least part of the signalling information may be contained in one or more signalling messages. In an embodiment, the at least part of the one or more auxiliary pictures may be contained in one or more signalling messages, In an embodiment, the signalling message may comprise one or more NAL units, such as one or more supplemental enhancement information, SEI, messages, one or more Open Bitstream Units, OBUs. In a further embodiment, the signalling messages may comprise one or one or more messages equivalent to such SEI or OBU messages.

In an embodiment, the one or more signaling messages may comprise at least one identifier, for example a frame number, identifying the first base picture in the sequence of coded first pictures.

In an embodiment, the signaling information may further include: information about the resolution to which the decoding process is going to change, In an embodiment, the signaling information may further include information about the identity of one or more VCL NAL units comprising a coded representation of the one or more auxiliary pictures.

In an embodiment, the signaling information may further comprise information for constructing the reference picture.

In an embodiment, the signaling information may comprise information associated with the sampling lattices that were used to form the base picture and the one or more auxiliary pictures and/or information associated with an interpolation filter for interpolating pixels values for the reference picture.

In an embodiment, the constructing of the reference picture may include one or more of the following steps: upscaling the base picture and the one or more auxiliary pictures to an upscaled base picture and one or more upscaled auxiliary picture respectively, the upscaling being based on the sampling lattices of the spatial a spatial subsampling scheme; summing the upscaled base picture and the one or more upscaled auxiliary pictures into a summed picture; and/or, applying an interpolation filter to the summed picture to determine pixel values that are missing in the summed picture.

In an embodiment, the encoded representation of the one or more auxiliary pictures may be computed using the base picture as a reference frame for at least one of the one or more auxiliary pictures.

In an embodiment, a sampling lattice defining pixels of a second picture may be selected to form the first picture.

In an embodiment, the decoding may be based on a coding standard, preferably a block-based video coding standard, more preferably an AVC, HEVC, VP9, AV1, VVC coding standard or a coding standard based on of the AVC, HEVC, VP9, AV1, VVC coding standards.

In an aspect, the invention may relate to a method of transmitting a bitstream comprising encoded representations of pictures of a first and second resolution version of a video to a device. In an embodiment, the method may comprise one or more of the following steps: transmitting a bitstream to the device, the bitstream comprising an encoded representation of first pictures of the first resolution version, the device comprising a decoder apparatus for decoding the encoded representation of first pictures into first pictures, the first pictures being associated with corresponding second pictures of the second resolution version of the video, the first pictures being subsampled versions of corresponding second pictures of the second resolution version, the subsampling being based on a first sampling lattice selected from a plurality of sampling lattices of a spatial subsampling scheme;

transmitting signalling information, preferably in the bitstream, to the device, the signalling information informing the decoder apparatus about a termination of receiving the encoded representations of the first pictures and the start of receiving of encoded representations of second pictures of the second resolution version, the signalling information further identifying at least one of the first pictures of the first resolution version as a first base picture and identifying one or more auxiliary pictures, the first base picture being associated with a corresponding second picture of the second resolution version, and, each of the one or more auxiliary pictures being a subsampled version of the corresponding second picture of the second resolution version, the subsampling being based on one or more further sampling lattices of the plurality of sampling lattices; transmitting an encoded representation of the one or more auxiliary pictures in the bitstream to the device for the decoder apparatus to decode the encoded representation of the one or more auxiliary pictures into one or more auxiliary pictures and construct a reference picture of the second resolution version based on the first base picture and the one or more auxiliary pictures; and, transmitting an encoded representation of second pictures in the bitstream to the device for decoding at least part of the encoded representation of the second pictures into one or more second pictures based on the reference picture.

In an aspect, the invention may relate to a decoder apparatus for decoding encoded representations of pictures of a first and second resolution version of a video. In an embodiment, the decoder apparatus may include a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code In an embodiment, the processor may be configured to perform executable operations comprising one or more of the following steps: receiving a bitstream comprising encoded representations of first pictures of the first resolution version, the first pictures being subsampled versions of corresponding second pictures of the second resolution version, the subsampling being based on a first sampling lattice selected from a plurality of sampling lattices of a spatial subsampling scheme; decoding the encoded representations of the first pictures into first pictures; receiving signalling information, preferably in the bitstream, the signalling information informing the decoder apparatus about a termination of receiving the encoded representations of the first pictures and the start of receiving of encoded representations of second pictures of the second resolution version, the signalling information further identifying at least one of the first pictures of the first resolution version as a first base picture and identifying one or more auxiliary pictures, the first base picture being associated with a corresponding second picture of the second resolution version, and, each of the one or more auxiliary pictures being a subsampled version of the corresponding second picture of the second resolution version, the subsampling being based on one or more further sampling lattices of the plurality of sampling lattices; receiving an encoded representation of the one or more auxiliary pictures in the bitstream, decoding the encoded representation of the one or more auxiliary pictures into one or more auxiliary pictures and constructing a reference picture of the second resolution version based on the first base picture and the one or more auxiliary pictures; and, receiving an encoded representation of second pictures in the bitstream and decoding at least part of the encoded representation of the second pictures into one or more second pictures using the reference picture.

In an embodiment, at least part of the signaling information and, optionally, the one or more auxiliary pictures, may be contained in one or more signaling messages, preferably one or more NAL units, such as one or more supplemental enhancement information, SEI, messages, one or more Open Bitstream Units, OBUs, or one or more messages equivalent to such SEI or OBU messages.

In an embodiment, the signaling information may further include one or more of the following: information about the resolution to which the decoding process is going to change and/or information about the identity of one or more VCL NAL units comprising a coded representation of the one or more auxiliary pictures; and/or, information for constructing the reference picture, preferably information associated with the sampling lattices that were used to form the base picture and the one or more auxiliary pictures and/or information associated with an interpolation filter for interpolating pixels values for the reference picture.

The decoder apparatus may be configured to execute any of the method steps described above.

In a further aspect, the invention may relate to a video transmission module for transmitting a bitstream comprising encoded representations of pictures of a first and second resolution version of a video to a device. In an embodiment, the video transmission module may comprise a computer readable storage medium having computer readable program code embodied therewith, and a processor, preferably a microprocessor, coupled to the computer readable storage medium, wherein responsive to executing the computer readable program code.

In an embodiment, the processor may be configured to perform one or more of the following executable operations: transmitting a bitstream to the device, the bitstream comprising an encoded representation of first pictures of the first resolution version, the device comprising a decoder apparatus for decoding the encoded representation of first pictures into first pictures, the first pictures being associated with corresponding second pictures of the second resolution version of the video, the first pictures being subsampled versions of corresponding second pictures of the second resolution version, the subsampling being based on a first sampling lattice selected from a plurality of sampling lattices of a spatial subsampling scheme; transmitting signalling information, preferably in the bitstream, to the device, the signalling information informing the decoder apparatus about a termination of receiving the encoded representations of the first pictures and the start of receiving of encoded representations of second pictures of the second resolution version, the signalling information further identifying at least one of the first pictures of the first resolution version as a first base picture and identifying one or more auxiliary pictures, the first base picture being associated with a corresponding second picture of the second resolution version, and, each of the one or more auxiliary pictures being a subsampled version of the corresponding second picture of the second resolution version, the subsampling being based on one or more further sampling lattices of the plurality of sampling lattices; transmitting an encoded representation of the one or more auxiliary pictures in the bitstream to the device for the decoder apparatus to decode the encoded representation of the one or more auxiliary pictures into one or more auxiliary pictures and construct a reference picture of the second resolution version based on the first base picture and the one or more auxiliary pictures; and, transmitting an encoded representation of second pictures in the bitstream to the device for decoding at least part of the encoded representation of the second pictures into one or more second pictures based on the reference picture.

In yet a further aspect, the invention may relate to a bitstream construction module comprising a computer readable storage medium having computer readable program code embodied therewith, and a processor, preferably a microprocessor, coupled to the computer readable storage medium, wherein responsive to executing the computer readable program code.

In an embodiment, the processor may be configured to perform one or more of the following executable operations: constructing a bitstream comprising encoded representations of pictures of a first and second resolution version of a video, the bitstream comprising a resolution change from an encoded representation of first pictures of the first resolution version of the video to an encoded representation of second pictures of the second resolution version of the video; and, transmitting the bitstream to a decoder apparatus, wherein the bitstream may comprise one or more of the following: an encoded representation of the first pictures, the first pictures being associated with corresponding second pictures of the second resolution version of the video, the first pictures being subsampled versions of corresponding second pictures of the second resolution version, the subsampling being based on a first sampling lattice selected from a plurality of sampling lattices of a spatial subsampling scheme; signalling information, preferably one or more signalling messages, for informing a decoder apparatus about informing the decoder apparatus about a termination of receiving the encoded representations of the first pictures and the start of receiving of encoded representations of second pictures of the second resolution version, the signalling information further identifying at least one of the first pictures of the first resolution version as a first base picture and identifying one or more auxiliary pictures, the first base picture being associated with a corresponding second picture of the second resolution version, and, each of the one or more auxiliary pictures being a subsampled version of the corresponding second picture of the second resolution version, the subsampling being based on one or more further sampling lattices of the plurality of sampling lattices; an encoded representation of the one or more auxiliary pictures for the decoder apparatus to decode the encoded representation of the one or more auxiliary pictures into one or more auxiliary pictures and construct a reference picture of the second resolution version based on the first base picture and the one or more auxiliary pictures; and/or, an encoded representation of second pictures wherein at least part of the encoded representation of the second pictures can be decoded by the decoder apparatus into one or more second pictures based on the reference picture.

Invention Works Best for Long GOP Structures

The invention may also relate to a computer program product comprising software code portions configured for, when run in the memory of a computer, executing the method steps according to any of process steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 2 depicts examples of spatial subsampling schemes;

FIG. 6 depicts encoding auxiliary pictures according to another embodiment of the invention;

FIG. 7A-7C depict constructing a reference frame according to another embodiment of the invention;

DETAILED DESCRIPTION

Figure 1A:
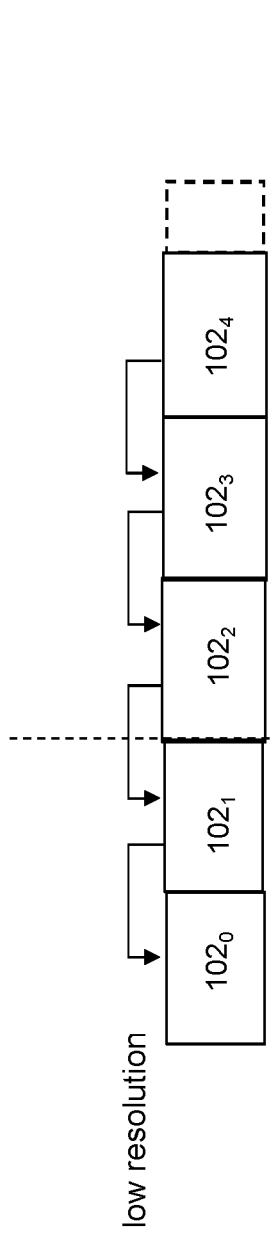
FIG. 1A-1D illustrates a conventional adaptive resolution change scheme.
Figure 1B:
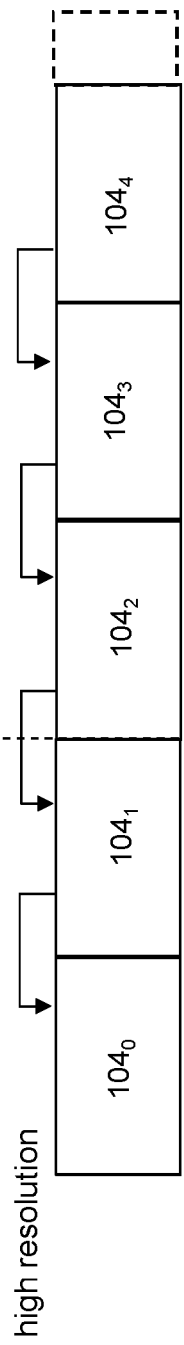

FIG. 1A-1D schematically illustrate a conventional adaptive resolution change (ARC) scheme. The scheme may include a video source, e.g. a video source in the network, that is part of a video streaming system for example a video on demand (VOD) system or a content distribution system (CDN). The video source may include video titles, wherein for every video title different resolution versions may be available. For example, as shown in FIGS. 1A and 1B, coded pictures $102_{0-4}$ of a low-resolution version and coded pictures $104_{0-4}$ of high-resolution version of a video title may be available for streaming to a video streaming client, wherein both resolution versions have an identical picture sequence structure, e.g. a group of picture (GOP) structure or a coded video sequence (CVS) structure. The high- and low-resolution versions have been separately encoded by an encoder, which may result for example in inter-picture coding dependences as indicated by the arrows in the figure. It is noted that the illustrated coding dependencies are just some of the many picture sequence structures that may be used in a video coding scheme. The first picture $102_0, 104_0$ of the sequence may be an intra-coded picture which can be used as a reference picture for the subsequent pictures $102_{1-4}$, $104_{1-4}$. For example, in this example, the structure may start with a an intra-coded (I) or an IDR frame followed by a predetermined number of P-frames, wherein each P frame references back to a previous picture in the sequence.

Figure 1C:
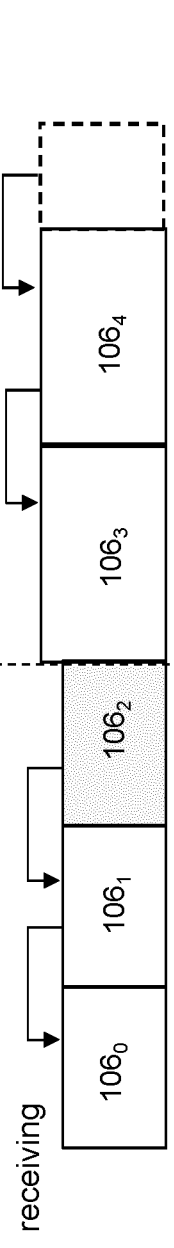

A video streaming session may include the transmission of a low-resolution version of the content to a video streaming client. During decoding of the coded low-resolution pictures a switch to the high resolution version may be triggered. For example, based on metrics, the client may decide that there is enough bandwidth for the high resolution version. In that case, the switch from the low resolution to the high-resolution version of the video title may be initiated either upon client requests or based on a network entity providing the video streams to the client. The sequence of coded pictures received by the video streaming client around the resolution change as a function of time is depicted in FIG. 1C, which depicts a sequence of low-resolution pictures $106_{0-2}$ followed—after the resolution switch—by a sequence of high-resolution pictures $106_{3,4}$.

Figure 1D:
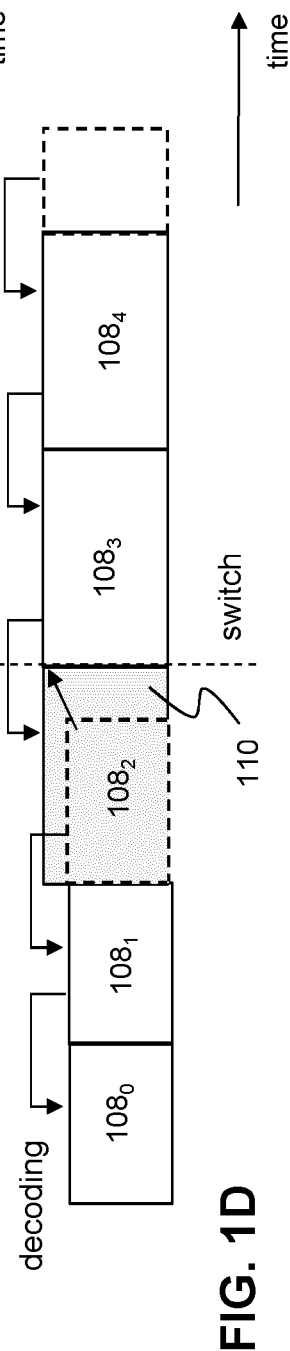

Both resolution versions are independently encoded, i.e. there is no coding dependency between the high- and low-resolution pictures. Therefore, low resolution picture $106_2$ is not a suitable reference picture for decoding the coded high-resolution pictures $106_{3,4}$ which are all P-frames. In conventional schemes, this problem may be solved by upscaling the low-resolution picture $106_2$ into a high-resolution picture that matches the resolution of the subsequent high resolution pictures $106_{3,4}$. This is shown in FIG. 1D wherein for example, an interpolation filter may be used to upscale decoded picture $108_2$ and interpolate the upscaled decoded picture into an upscaled interpolated reference picture 110, which may be stored in the decoded picture buffer of the decoder so that it can be used as a reference picture for decoding the high-resolution pictures. However, in many situations reference picture 110 is not a good approximation of the original high-resolution picture $104_1$. This way, drift may occur when decoding high-resolution pictures $108_{3,4}$ based on this reference picture.

When using the reference picture for decoding multiple high-resolution pictures, the drift will increase for each subsequent decoded picture causing an incremental decrease in the quality between the decoded pictures compared to decoded pictures of the original high-resolution stream. This way, drift will be visible in the rendered pictures as a substantial drop in the quality of the pictures. This quality drop may be such that such a resolution change scheme cannot be used in practical applications.

Hence, when a video streaming client wants to switch resolution between a high- and low version of a video, the client typically has to wait until the next I frame (or IDR frame) in the stream is available in order to avoid quality degradation of the video signal due to drift. Depending on the position of the switching point in the GOP, waiting for an I frame may take a plurality of coding cycles thereby delaying the resolution switch. Alternatively, a relatively large I frame may be sent at the point where a resolution switch is desired thereby unnecessarily increasing the bandwidth. Thus, from the above it follows that there is a need in the art for switching to a different video resolution at a random point in the stream without requiring an I frame (or an IDR frame) or a substantial reduction in the user experience. The adaptive resolution coding schemes described with reference to the embodiments in this application provide schemes that allows such resolution switch.

Figure 3:
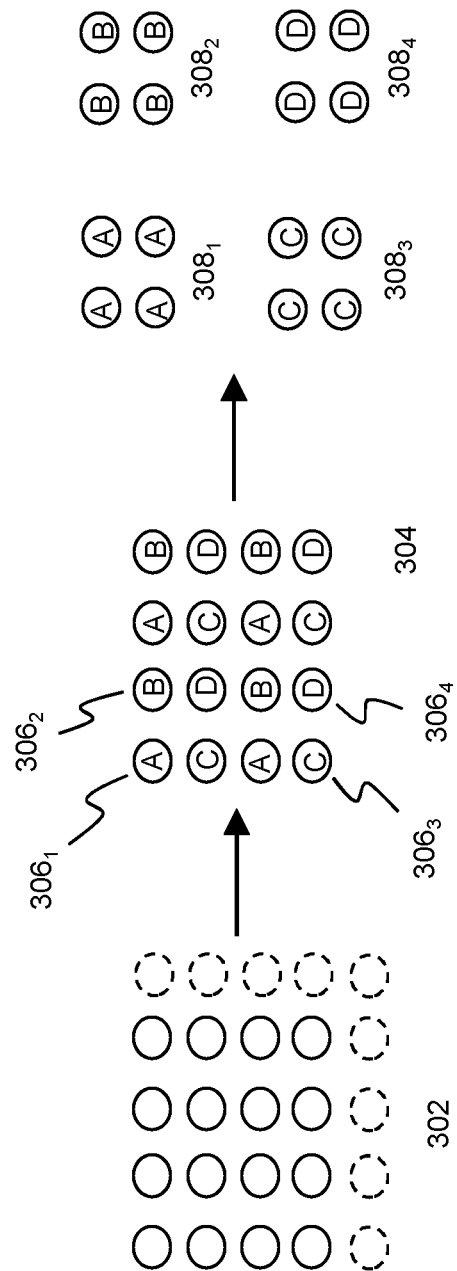
FIG. 3 depicts a polyphase subsampling scheme.

As will be described hereunder in more detail, the embodiments make use of spatial subsampling schemes, which use a subset of the original high resolution samples, to create a low-resolution version of a video. Examples of such spatial subsampling schemes are depicted in FIGS. 2 and 3. FIG. 2 depicts part of a picture, that may be formed by sampling a continuous image based on a (regular) sampling lattice, e.g. a high-resolution lattice of video samples 202. Here, each sampling point in the sampling lattice forms a pixel value in the high-resolution video frame. The video samples may form a block of video samples, in this case a 4×4 block, and a picture typically may comprise of such blocks of pixels (or simply pixel blocks). Typically, a decoder may be configured to apply operations, e.g. filtering, sampling, interpolation, etc. on blocks of pixels in a video frame. Different types of low-resolution video frames may be formed on the basis of the high-resolution frames of a high-resolution video signal by using different low-resolution sampling lattices $204_{1-4}$. A low-resolution sampling lattice has a lower sampling density than the sampling lattice of the high-resolution video frames.

In contrast to the downsampling operations known from e.g. scalable video coding standards such as Scalable Video Coding of AVC (SVC) and Scalable HEVC (SHVC) wherein new pixel values of the video frames of the downsampled video signal are calculated based on sets of pixel values in the video frames of the original high-resolution video signal, a spatial subsampling operation does not change the pixel values. Spatial subsampling only selects a subset of pixel values from a set of pixels values forming a picture of a particular resolution. The spatial subsampling scheme allows very efficient reconstruction of the original video signal or a low-resolution version thereof. Additionally, the spatially subsampled pictures of the resolution components allow the use of super resolution techniques for constructing a high-resolution video frame. It is noted that the sampling lattices shown in FIG. 3 should be considered as examples of a large number of different sampling lattices that may be used. Based on a sampling lattice, two or more versions of a low-resolution picture may be formed by subsampling a high-resolution picture. These different low-resolution versions may be referred to as low-resolution phases or low-resolution components.

Pictures produced by a sampling lattice of a spatial subsampling scheme may represent a picture of a resolution component. A group of sampling lattices may be selected such that the resolution components generated based on this group of sampling lattices can be used to reconstruct the original high-resolution video signal, i.e. reconstruct a video signal that is identical or almost identical to original high-resolution video signal. Further, one or more sampling lattices may be selected such that of the resolution components generated on the basis of these one or more sampling lattices may be used to construct a low-resolution version of the high-resolution video signal.

In some embodiments, the sampling lattices used for subsampling a high-resolution video frame may have the same sampling density. Resolution components generated based on such sampling lattices have the same resolution. In other embodiments (some of) the sampling lattices may have different sampling densities. In that case, (some of) the resolution components have different resolutions. Moreover, as shown in FIG. 2, in some embodiments, sampling lattices may have overlap, i.e. one or more sampling points in common. In other embodiment, there is no overlap between sampling lattices. Hence, groups of resolution components may be generated based on spatial subsampling as depicted in FIG. 2. All the resolution components in the group may be used to reconstruct the original high-resolution video signal and some of the resolution components in the group may be used to construct one or more low resolution version of the high-resolution video signal.

FIG. 3 depicts a polyphase subsampling scheme for generating a number of video frames (in the example four) of lower resolution on the basis of pixels 302 of a high-resolution video frame. In polyphase subsampling blocks of pixels of a video frame may be spatially subsampled into a plurality of low-resolution components using polyphase subsampling lattices of the polyphase subsampling scheme. For example, a block of 4×4 pixels (forming a 4×4 pixel matrix) may be spatially subsampled into four blocks of 2×2 pixels (each forming a 2×2 pixel matrix). For example, a first polyphase subsampling lattice may be used to select pixels $306_1$ in the block of pixels which labelled with an "A". Similarly, a second polyphase subsampling lattice may be used to select pixels $306_2$ labelled with an "B", etc. This way, different resolution components $306_{1-4}$ can be selected in the 4×4 pixel matrix. These selected resolution components may be represented into four different 2×2 pixel matrices $308_{1-4}$. The polyphase subsampling process may be applied to all bocks of a video frame to form four different low-resolution pictures based on one high-resolution picture.

The polyphase subsampling scheme may be applied to any type of high-resolution video frame format. For example, in an embodiment, a high-resolution video frame may have a YUV-type colour format, e.g. a YUV 4:2:0 color format, 1920×1088 resolution, 24 frames per second, 24 frames. Subjecting this high-resolution video frame to a polyphase spatial subsampling process with a with factor 2 (applied to Y, U and V) would result in four low-resolution video frames of the YUV 4:2:0 colour format, 960×544 pixel resolution and a frame rate of 24 fps.

The polyphase subsampling scheme as depicted in FIG. 3 provides the advantage that it allows very fast operation at both encoder and decoder side, where pixel values are not changed. Visual artefacts due to spatial aliasing effects if any, when the original signal contains frequencies greater than twice the subsampling frequency, may be eliminated based on a post-filtering operation based on anti-aliasing filters to enhance the output frames of the resolution components and cancel as much as possible these visual artefacts.

Thus, based on a spatial subsampling scheme, such as the polyphase subsampling scheme, four low-resolution video streams may be generated based on a high-resolution video stream. One of these low-resolution video streams, e.g. a low-resolution video stream obtained by one of the four polyphase sampling lattices, and encoded bitstream.

Figure 4A:
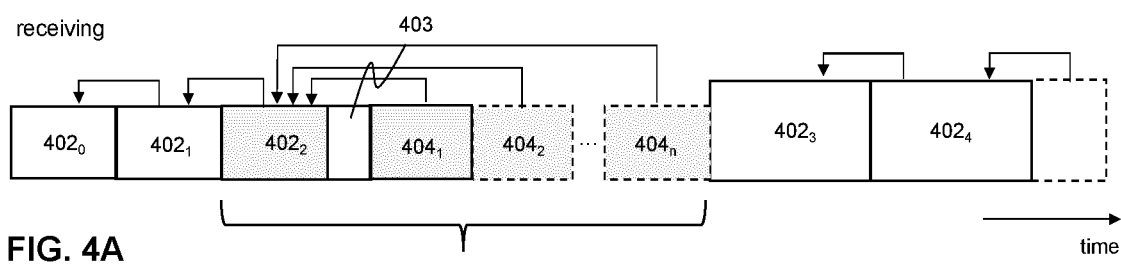
FIGS. 4A and 4B depict an adaptive resolution change scheme according to an embodiment of the invention.
Figure 4B:
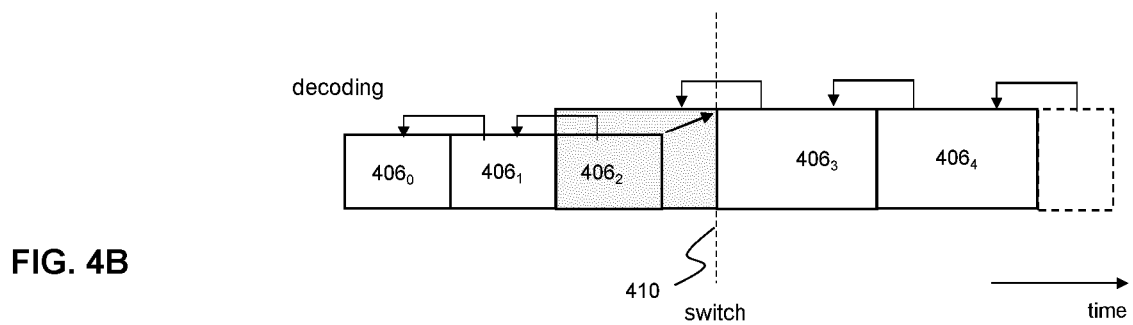

FIGS. 4A and 4B depict an adaptive resolution change (ARC) scheme according to an embodiment of the invention. As described above with reference to FIGS. 2 and 3, the scheme assumes that different resolution versions, e.g. a high- and low-resolution version, of a video are available, wherein the low-resolution version of the video is obtained by spatially subsampling pictures of the high resolution version based on a sampling lattice of a spatial subsampling scheme. Further, the high-resolution and low-resolution version of the video may be independently decoded so that there is no coding dependency between the two resolution versions. For example, in a simulcast streaming session wherein two or more video streams of different resolution (which are completely independent from each other in terms of coding) are broadcast simultaneously to a video streaming client.

As will be shown hereunder in more detail, the sampling relation between the pictures in the high- and low-resolution versions of the video will be exploited to provide an efficient scheme for reconstructing an accurate reference picture for decoding coded pictures after a resolution change at an arbitrary location in the GOP structure of a video bitstream. These schemes may be used both for a switch from a low-resolution to a high-resolution version and from a high-resolution to a low-resolution.

FIG. 4A depicts a coded representation of a sequence of pictures received by a video streaming client as a function of time, wherein the sequence of pictures comprises a resolution change from pictures with of a first (low) resolution to pictures of a second (high) resolution. Here, the sequence may represent the sequence in which the coded pictures are transmitted as a coded bitstream to the video streaming client. Upon reception of the bitstream, the decoder apparatus may store each coded picture in the coded picture buffer (CPB) of the decoding apparatus based on a certain data format, e.g. as an access unit (AU).

As shown in this figure, the client may receive coded pictures $402_{0-2}$ of a first resolution version of the video from a source, wherein the coded pictures may have an inter-picture coding dependency based on for example a predetermined GOP structure. During streaming, the client may request a source, e.g. a VOD system or a CDN, to switch from streaming a low-resolution version of the video to streaming the high-resolution version of the video. Alternatively, the source itself may decide that switching to a high resolution is desired. As will be described hereunder in greater detail, the resolution change may take place at an arbitrarily location within the GOP structure of the video without incurring a substantial drop in the video quality due to drift and without requiring transmission of an extra I frame or the like.

The resolution change may be signalled using metadata 403 in the bitstream. The metadata may include a certain message followed by one or more coded auxiliary pictures $404_{1-n}$ that have the same resolution as the low resolution pictures. The auxiliary pictures are followed by coded high-resolution pictures $402_{2,3}$ which are used for continuing the video streaming session in the high resolution mode. To signal a resolution change, the sequence may for example include at least one signalling message, e.g. a SEI message or a message equivalent to a SEI message, into the bitstream. The message may be inserted in the bitstream at the location were a resolution change is desired. The message may signal the decoder apparatus that a resolution change should take from decoding low-resolution pictures to decoding high-resolution pictures (or vice-versa). Further, the message may signal the decoder apparatus that at least one reference picture should be constructed that has a resolution that complies with the resolution of the pictures after the resolution change. Thus, if the resolution change is from a low to a high resolution, a high-resolution reference picture is constructed so that after the change a high resolution picture can be decoded based on the stored reference picture without generating drift.

Further, the message may identify at least one coded low-resolution picture that may be used to reconstruct the reference picture. This identified coded low-resolution picture may be referred to as a base picture. Identification of the low-resolution base picture in the coded sequence of pictures by the message may be implicit in the sense that the coded low-resolution picture $402_2$ (directly) preceding, the signalling message may be the base picture that should be used in the construction of the reference picture. Alternatively, the identification may be explicit in the sense that the signalling message comprises information, e.g. a pointer or a frame number, identifying the coded low-resolution picture $402_2$ as the base picture.

The message may further identify one more coded auxiliary pictures $404_{1-n}$ in the bitstream that have the same resolution as the low-resolution pictures. These auxiliary pictures are related to the base picture in the sense that they are all generated by spatially subsampling one high resolution picture. This is a direct consequence of the fact that the low-resolution version of the video is generated by subsampling the high-resolution video based on a predetermined spatial subsampling scheme. This way, the signalling message signals the decoding apparatus to reconstruct a reference picture based on the base picture and the one or more auxiliary pictures as identified by the signalling message.

The coded low-resolution auxiliary pictures may be generated by a video encoder, e.g. during the creation of the low-resolution version of the video, using the different spatial subsampling lattices of a spatial subsampling scheme. The formation of the low-resolution auxiliary pictures may include subsampling the high-resolution pictures of the high-resolution version of the video. The decoded auxiliary pictures and the base picture may be used to construct a high-resolution reference picture that is suitable for decoding coded high-resolution pictures which will be received by the video streaming client after the resolution change.

The decoding process during the resolution change is depicted in FIG. 4B. After decoding the coded low-resolution picture $406_2$ identified by the signalling message 403, the one or more coded auxiliary pictures $404_{1-n}$ may be decoded. In an embodiment, the auxiliary pictures may be encoded using the base picture $402_2$ as a reference for encoding the auxiliary pictures. Hence, the auxiliary pictures can be efficiently encoded in the bitstream and will only take little extra bandwidth.

After decoding, the base picture and the one or more auxiliary pictures may be upsampled to the resolution of the high-resolution pictures based on the sampling lattices of the spatial subsampling scheme. The thus upsampled pictures may be summed and an interpolation filter may be applied to the resulting picture to determine any missing pixels. The interpolated high-resolution picture may then be stored as a reference picture in the decoded picture buffer (DPB) of the decoding apparatus. Moreover, the decoding apparatus may start decoding the coded high-resolution pictures based on the reference picture stored in the decoded picture buffer.

The reconstruction of the reference picture based on different spatially subsampled versions of the original high-resolution picture provides an efficient scheme to determining a reference picture for a resolution change at a position in the GOP that does not coincide with an I frame.

Figure 5:
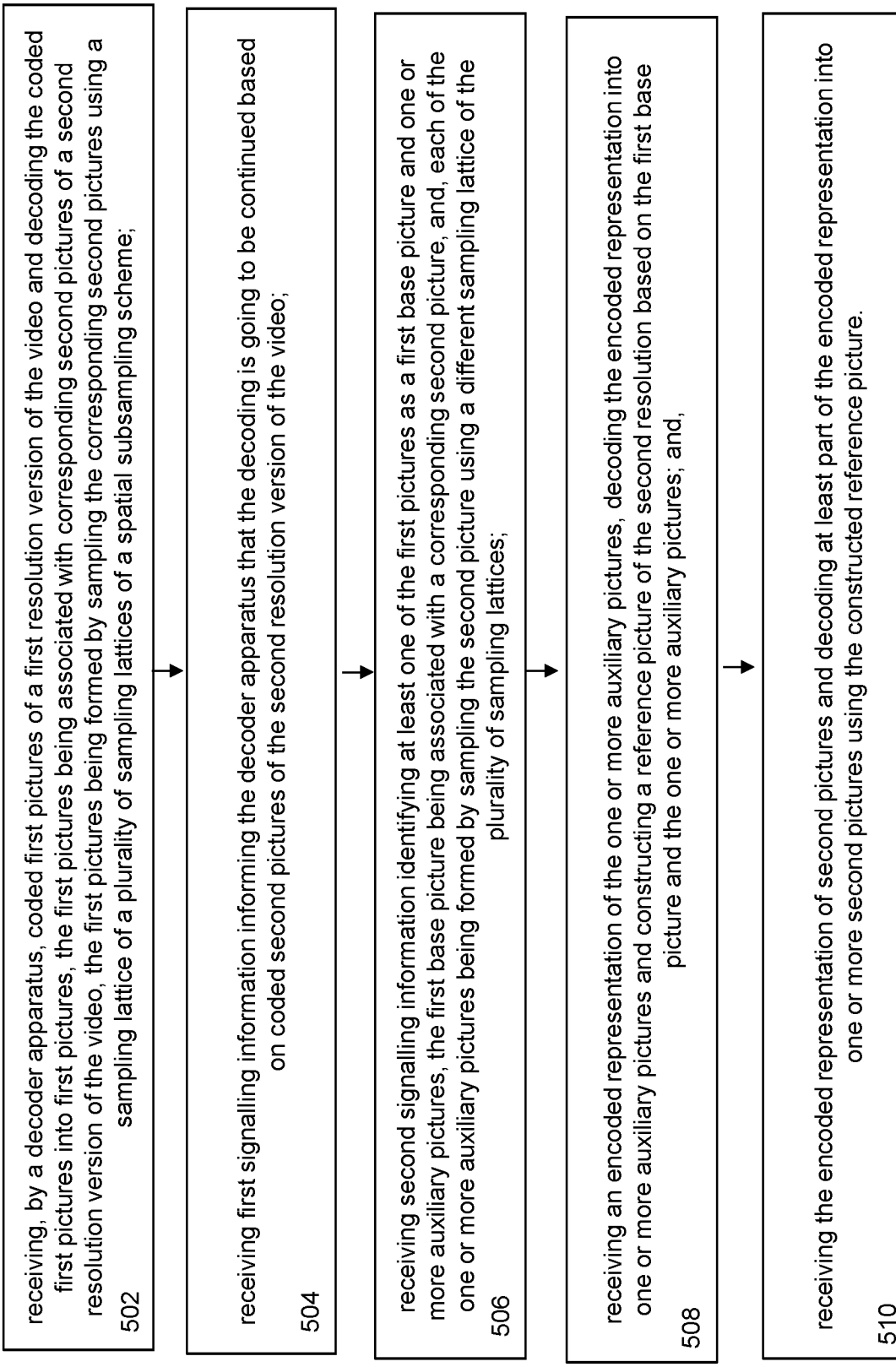
FIG. 5 depicts a flow diagram of a decoding process according to an embodiment of the invention.

FIG. 5 depicts a flow diagram of a decoding process according to an embodiment of the invention. The decoding process may be executed by a decoder apparatus, which may be implemented in or associated with a video streaming client, which is configured to set up a streaming session between the video streaming client and a video source, e.g. VOD system or a CDN. During the streaming session, an encoded representation of a sequence of pictures may be transmitted as a bitstream to the video streaming client. The coded pictures may be buffered in a coded picture buffer (CPB) and be decoded by the decoder apparatus associated with the mobile device, which may be rendered on a display device associated with the client apparatus.

In a first step, the decoding process may include the decoding apparatus receiving an encoded representation of a sequence of pictures of a first resolution (step 502). The coded pictures of the first resolution (first resolution pictures) may be stored in the CPB and subsequently decoded into decoded pictures (or in short pictures) which may be stored in the decoded picture buffer (DPB) which may temporarily store pictures that are needed as reference pictures during the decoding process. The first resolution pictures may be formed based on sampling pictures of a second resolution (second resolution pictures) of the video using a spatial subsampling lattice of a spatial subsampling scheme. The spatial subsampling scheme may include a plurality of subsampling lattices, wherein one of the sampling lattices is used for producing the first (low-resolution) version of the video.

During the decoding process, the decoder apparatus is adapted to handle a resolution change request as described with reference to FIGS. 4A and 4B. To that end, the decoder apparatus may receive metadata, a signalling message, informing the decoder apparatus on a resolution change of the pictures in the bitstream (step 504). The signalling message may identify at least one of the first resolution pictures in the sequence of pictures. This identified first-resolution picture may be referred to as a base picture for reconstructing a reference picture that can be used in the decoding of the second resolution pictures.

The signalling message may further inform the decoder apparatus of one or more coded auxiliary pictures (step 506), wherein the base picture and each of the one or more auxiliary pictures may be formed based on sampling the picture of the second resolution version using different sampling lattices of the spatial subsampling scheme. Hence, both the auxiliary pictures and the base picture are formed by sampling the associated high-resolution picture based on different sampling lattices. The signalling message may be implemented in different ways. In some embodiments, the signalling message may be implemented as or part of a NAL unit, such as SEI message or a message of a video codec that is similar or equivalent to a SEI message.

The decoder apparatus may then receive the one or more coded auxiliary pictures and the coded pictures of the second resolution version and decode the one or more coded auxiliary pictures into one or more auxiliary pictures (step 508). Thereafter, a reference picture of the second resolution may be formed based on the based picture and the one or more auxiliary pictures; and, at least part of the coded second resolution pictures may be decoded based on the reference picture (step 510).

As described above, the signalling message for informing the decoder apparatus about a resolution change may have different formats such as SEI message. An example of a SEI message for signalling a resolution change is provided in table 1 below:

|  | Descriptor |
|---|---|
| polyphase_rpr( payloadSize) { | |
|   reference_frame | ue(v) |
|   phases_present | u(3) |
|   target_height | ue(v) |
|   target_width | ue(v) |

As shown the message may include parameters such as a reference frame parameter reference_frame and a phase parameter phases_present. The reference frame parameter reference_frame provides information to the decoder regarding the reference frame or reference frames in the decoded picture buffer to which the NAL units following the SEI message belong to. Such parameter may be used if many frames need to be upscaled and many SEI messages will arrive. The phase parameter phases_present may inform a decoder which of the resolution phases of a spatial subsampling scheme are present. For example, for a polyphase subsampling scheme this parameter may include four different values, each representing a resolution phase of the respective subsampling scheme. This parameter may inform the decoder of how many NAL units are following that belong to the resolution switch.

Finally, in an embodiment, the signalling message may further include a parameter target_height and a parameter target_width, which may inform the decoder apparatus about the resolution of the reference picture that should be constructed based on the base picture and the one or more auxiliary pictures.

In an example, a decoder is required to upscale reference frames −3 and the current frame and will use all three additional phases to get to a target resolution of 1920×1080. In this case, the decoder would receive a first signalling message, e.g. a SEI message, comprising the reference frame set to −3, the phases_present parameters all active, the target_height and target_width parameters set to 1080 and 1920 respectively. This information informs the decoder that the next three NAL units comprises the three signalled phases. Next the decoder would receive a further signalling message, e.g. SEI message, comprising the reference frame parameter reference_frame that is set to 0, phases_present all active, the target_height and target_width set to 1080 and 1920 respectively. As mentioned before, the next 3 NAL units comprise the three resolution phases which can be used in the resolution switch.

In one embodiment, NAL units comprising the resolution phase or phases may be inserted in the SEI message. This may be realized using an attribute phase_X_NAL_unit which can identify whether NAL units comprising auxiliary pictures are present in the SEI message. These nested NAL units can then be used in the decoding process.

The message may be implemented based on standardisation specifications that have different signalling methodology when compared to the use of SEI messages. In an embodiment, the message may have a format according to the AV1 standard, wherein the metadata may be formatted as an Open Bitstream Units (an OBU). An example of such message is provided in table 2:

|  | Type |
| --- | --- |
| polyphase_rpr( ) { |  |
| reference_frame | uvlc(v) |
| phases_present | f(3) |
| target_height | uvlc(v) |
| target_width | uvlc (v) | wherein the parameters may have the same meaning as in the previous example.

Further, in an embodiment, the parameters (not shown) may include information on an interpolation scheme that may be needed when constructing the reference picture in the case that not all the phases are sent. In yet a further embodiment, the parameters may include information about the spatial subsampling scheme that was used for constructing the low-resolution version. Further, the signalling message may include any other information (e.g. in the form of parameters or a script, e.g. a number of rules) that the decoder needs to know when constructing the reference pictures.

FIG. 6 illustrates an example of an encoded representation of a base picture and a plurality of auxiliary pictures according to an embodiment of the invention. As already explained above, pictures of a low-resolution version of a video may be obtained by spatially subsampling pictures of a high-resolution version of the video based on one of the spatial sampling lattices of a spatial subsampling scheme. The other spatial sampling lattices of the spatial subsampling scheme may be used to generate a plurality of auxiliary pictures $604_{1-3}$ for a picture 602, a base picture, in the low-resolution stream. When using a polyphase subsampling scheme for example, three auxiliary pictures may be generated for one low resolution picture. In an embodiment, these auxiliary pictures may be contained in a SEI message as described above. Moreover, since there is a close spatial correlation between pixels of the four pictures 602, $604_{1-3}$ it may be beneficial to encode the auxiliary pictures using base picture 602 as a reference picture. The arrows pointing from each auxiliary picture to the base picture provides an example of possible coding dependency, however other dependencies are possible as well. For example, PA may be used as a reference picture of PB, PB may be used as a reference picture for PC and PC may be used as a reference picture for PD. Hence, well-known inter-picture prediction schemes may be used to efficiently encode the one or more auxiliary pictures. In an embodiment, at least one of the auxiliary pictures may use the base picture as a reference frame. In another embodiment, all auxiliary pictures may use the base picture as a reference frame. Such dependency is advantageous as it allows flexible insertion of one or more coded auxiliary pictures in the bitstream.

FIG. 7A-7C illustrates an example of a construction of part of a reference picture according to an embodiment of the invention. As already described above in more detail, an encode representation of a base picture and one or more auxiliary pictures, in this example one auxiliary picture may be decoded and upscaled according to the sampling lattice they are processed with. Based on the information in the signalling message, the decoder apparatus may determine for example that a resolution change should take place to a predetermined target resolution and that the construction of a high-resolution reference frame should be based on an identified base picture and one auxiliary picture using the polyphase subsampling scheme and a predetermined interpolation scheme e.g. a bilinear interpolation scheme, to determine missing pixel values.

FIG. 7A, depicts pixel values $702_{1-4}$ of a block of pixels of a decoded and upscaled base picture wherein the pixels are arranged on positions of a first spatial subsampling lattice, i.e. the sampling lattice that is used to determine the pictures of the low-resolution version of the video. FIG. 7B depicts pixel values of a block of pixels comprising both the pixels values of the decoded and upscaled base picture and pixel values $704_{1-4}$ of a decoded and upscaled auxiliary picture. As shown in the picture, the pixel values of the auxiliary pixels based on a different subsampling lattice than the lattice used for the base picture. As the construction in this example is based on two resolution components (resolution phases) of the four possible resolution components of the polyphase subsampling scheme, the block of pixels still includes missing pixel values. An interpolation filter may then be used to determine an estimate of pixel values that are missing (as illustrated by the white pixel in the block of pixels as depicted in FIG. 7B). FIG. 7C depicts the resulting block of pixels including pixels values $704_{1-4}$ and $706_{1-4}$ that have been determined interpolated based on the pixel values in the block of pixels as shown in FIG. 7B and, possibly, pixel values of neighbouring blocks.

Figure 8A:
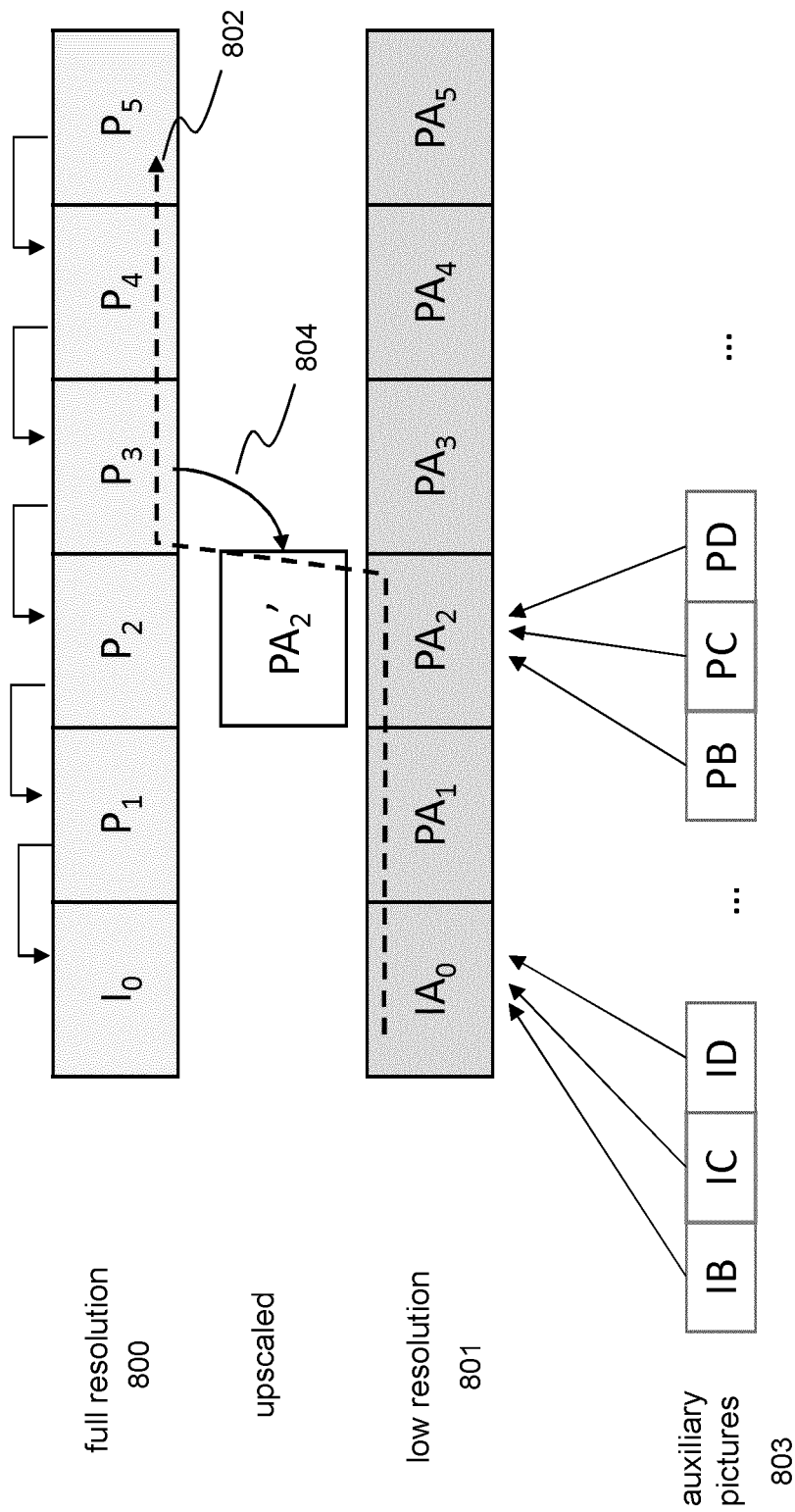
FIGS. 8A and 8B depict an adaptive resolution change scheme according to an embodiment of the invention.
Figure 8B:
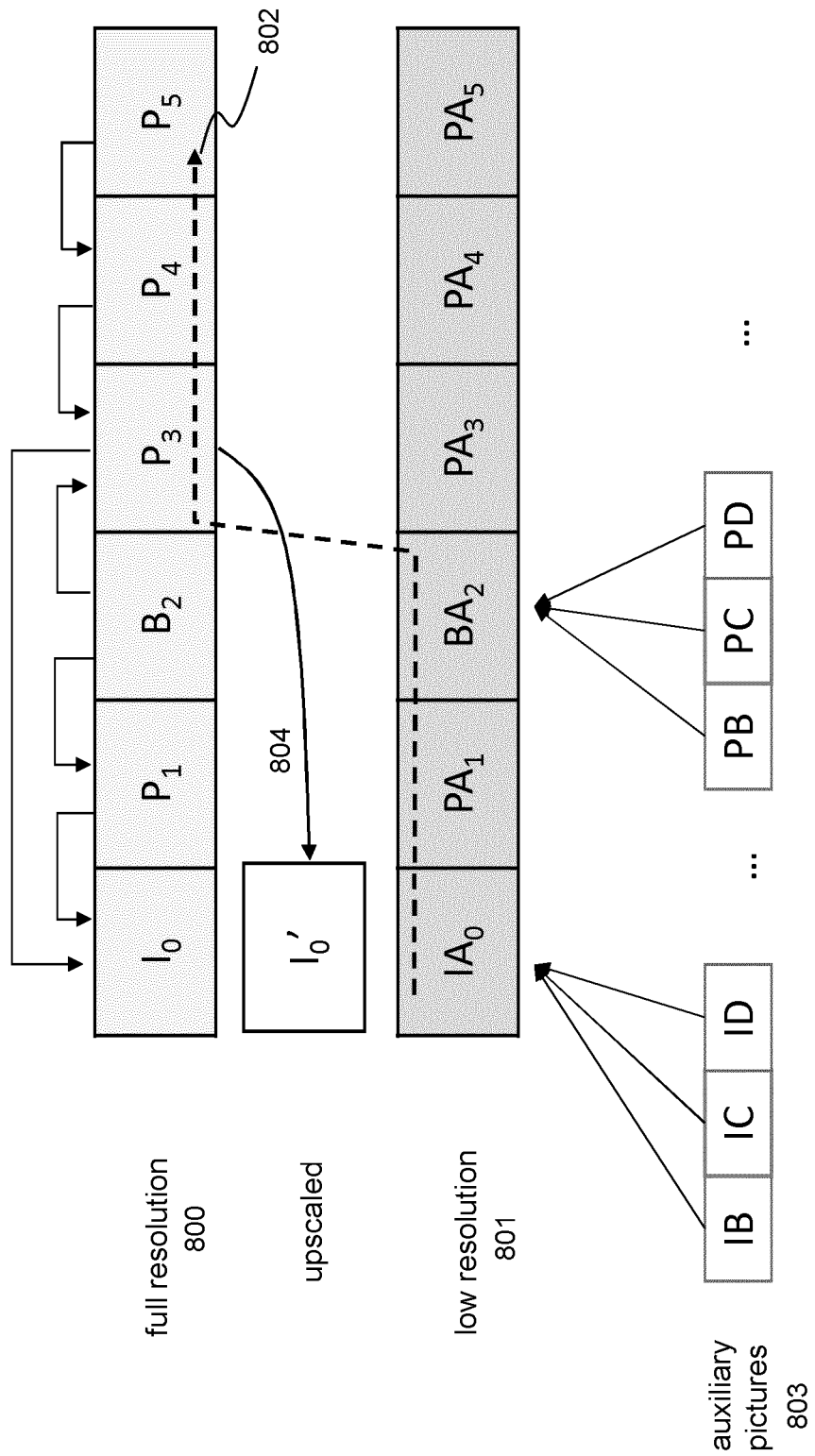

FIGS. 8A and 8B illustrate a high-level overview of resolution change during decoding for different sequence of pictures structures. Typically, an encoded representation of a sequence of pictures comprises a picture sequence structure such as a coded video sequence (CVS) structure comprising one or more groups of pictures (GOP) structure. Such coded pictures in such picture sequence structure may form a self-contained set of video data which can be decoded without requiring any further information external to the picture sequence structure. FIG. 8A depicts an example of a sequence of pictures structure including an I picture followed by a number of P pictures (i.e. a IPPPPP structure) wherein each P picture is used as a reference picture for the subsequent P picture. In this example, both low- and high-resolution version of the video may have the same interdependency structure within a GOP and the same GOP pattern throughout the CVS, as indicated by the I and P labelling of the pictures. Hence, every picture in the low-resolution version has a corresponding picture in the high-resolution version if a resolution change is required. It is noted however, that the low- and high-resolution streams may also have different GOP or CVS structure.

In that case, at the resolution change, the one or more low resolution pictures that need to be upscaled for forming one or more reference frames for decoding the first high resolution picture need to be stored in the decoded picture buffer. Further, low resolution pictures that need to be upscaled for reference frame formation for the decoding of further high-resolution pictures need to be stored in the decoded picture buffer. In that case, it may be advantageous to include the reference frames (or information to determine such frames) of the low-resolution pictures that need to be up sampled in the signaling message.

Depending on certain parameters or circumstances (e.g. bandwidth availability) a streaming session may be based on a first resolution version of a video, e.g. the low resolution or high resolution, wherein the low resolution version is one of the subsampled versions of the high resolution version. As shown in figure, the pictures of the low-resolution video 801 are one resolution component (in this case resolution component A) of a (polyphase) spatially subsampled version of the high-resolution video 800. The different auxiliary pictures 803 may be generated based on different polyphase subsampled versions (resolution components B, C and D) of the same high resolution video. Depending on the implementation, auxiliary pictures for the low-resolution video may generated either for every picture, for some pictures (e.g. at predetermined switching positions in a GOP) or on the fly. Further, in case the GOP structures of the low and high resolution are the same (and aligned), auxiliary pictures are only generated for reference frames as non-reference frames do not need to be upsampled during a resolution change.

The dotted line 802 illustrates how in pictures during a resolution change are decoded. The figure illustrates that at low resolution picture $PA_2$, the base picture, a resolution change to the full (high) resolution video takes place wherein based on one or more auxiliary pictures associated with the base picture a reference picture $PA_2'$ is constructed to serve as a reference picture 804 for high resolution picture $PA_3$.

FIG. 8B depicts a sequence of pictures structure including an I picture followed by B and P pictures (i.e. a IPBPPP structure), wherein the B pictures references an earlier and later P picture. If a resolution change is signalled at the $BA_2$ picture, a switch to the high resolution $P_3$ picture is made possible by constructing an upscaled $I_0'$ picture based on the low resolution $IA_0$ picture, the base picture, and one or more of the auxiliary pictures IB,IC,ID.

Figure 9:
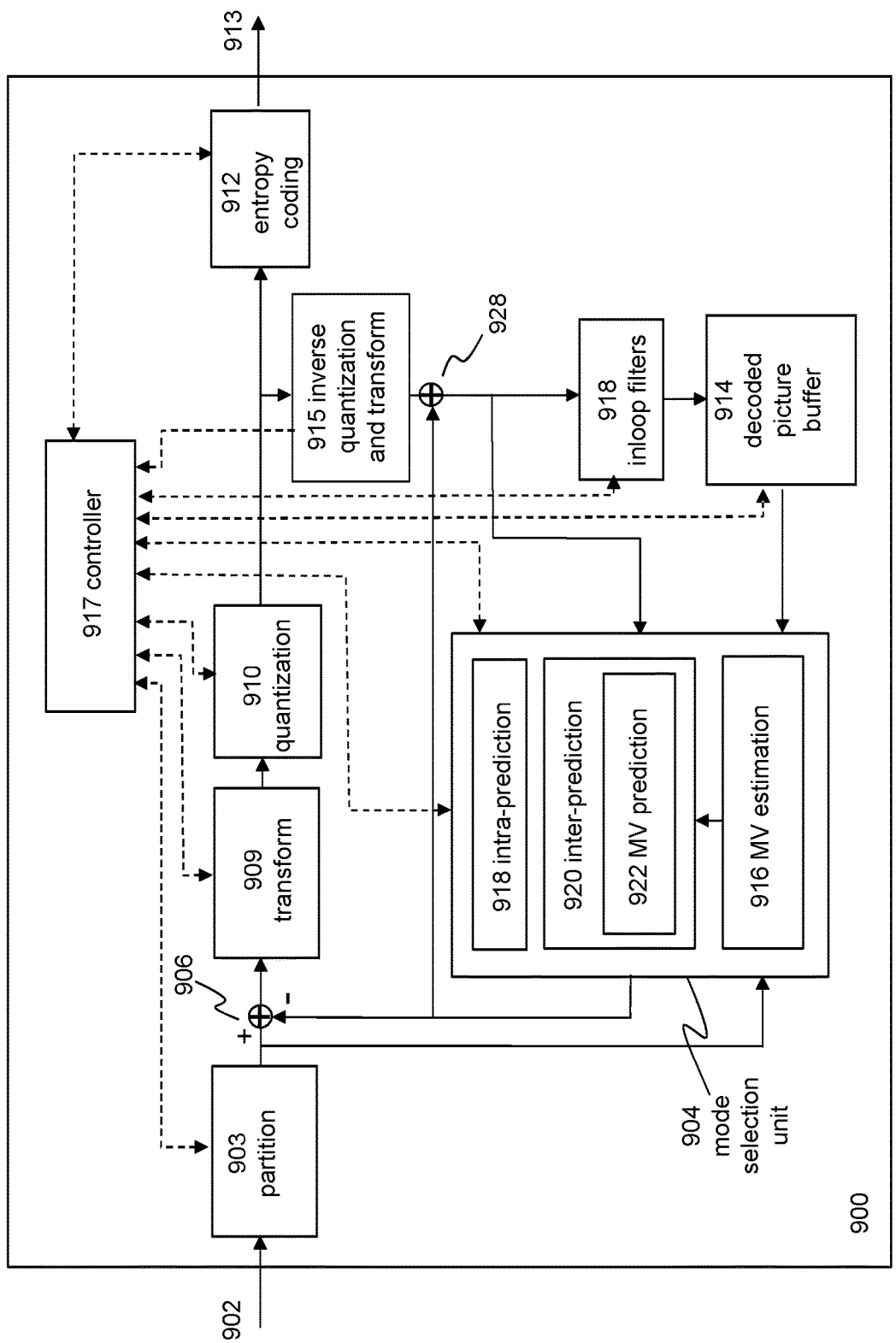
FIG. 9 depicts an encoder apparatus according to an embodiment of the invention.

The examples depicted by FIGS. 8A and 8B show that if a picture is referenced, the referenced picture must be in the same resolution as the picture that is referencing it. Therefore, if a low-resolution picture is referenced by a high-resolution picture, it must be upscaled based on one or more auxiliary picture. Either way this picture should remain in the DPB (as it will always be used as a reference if both high and low res have the same GOP structure) so it can be upscaled. The same holds for a situation wherein a high-resolution pictures refers back to two or more reference pictures. For example, the first high resolution picture after a resolution switch references back to two earlier pictures, e.g. an I picture and a P picture, then two high resolution reference pictures need to be constructed based on the low resolution I and P picture (i.e. two base pictures) that are stored in the decoded picture buffer and their associated auxiliary pictures. Hence, in that case, the signalling message may identify two base pictures in the low-resolution sequence of pictures and it may identify the associated auxiliary pictures in the bitstream. Alternatively, multiple messages, e.g. two SEI messages, may be used to signal a resolution change wherein each message signals one reference frame and the associated auxiliary pictures FIG. 9 is a block diagram illustrating a video encoder apparatus 900 that is configured to provide the partial output functionality as described with reference to the embodiments in this application.

Video encoder apparatus 900 may perform intra- and inter-coding of video blocks within video frames or parts thereof, e.g. video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The video encoder apparatus may receive video data 902 to be encoded. In the example of FIG. 9, video encoder apparatus 900 may include partition unit 903, a mode select unit 904, summer 906, transform unit 909, quantization unit 910, entropy encoding unit 912, and decoded picture buffer 914. Mode select unit 904, in turn, may comprise a motion estimation unit 916, inter-prediction unit 920, and intra prediction unit 918. Inter-prediction unit may comprise a motion vector prediction unit 922, which may be configured to generate a list of motion vector predictor candidates according to the embodiments in this application. For video block reconstruction, the video encoder apparatus 900 may also include inverse quantization and transform unit 915, and summer 928. An in-loop filter, such as a deblocking filter 918, may also be included to filter-out artefacts from the reconstructed video frames. Additional loop filters (in loop or post loop) may also be used in addition to the deblocking filter. In case during the decoding of a coded picture an in-loop-filter is used to filter out artefacts, then metadata, e.g. a flag, may be inserted into the bitstream for signalling a decoder that it should use the in-loop filter during decoding. For example, in HEVC, the information whether the in-loop filter(s) are enabled may be inserted in the SPS or PPS messages, depending on whether the in-loop filtering is enabled or disabled on a per-picture or per-picture set basis.

The mode select unit 904 may select one of the coding modes (e.g. intra-prediction or inter-prediction modes based on error results of an optimization function such as a rate-distortion optimization (RDO) function), and provides the resulting intra- or inter-coded block to summer 906 to generate a block of residual video data (a residual block) to summer 928 to reconstruct the encoded block for use as a reference picture. During the encoding process, video encoder 900 may receive a picture or slice to be coded. The picture or slice may be partitioned into multiple video blocks. An inter-prediction unit 920 in the mode selection unit 904 may perform inter-prediction coding of the received video block relative to one or more blocks in one or more reference pictures to provide temporal compression. Alternatively, an intra-prediction unit 918 in the mode selection unit may perform intra-prediction coding of the received video block relative to one or more neighbouring blocks in the same picture or slice as the block to be coded to provide spatial compression. Video encoder may perform multiple coding passes, e.g., to select an appropriate coding mode for each block of video data.

The partition unit 903 may further partition video blocks into sub-blocks, based on evaluation of previous partitioning schemes in previous coding passes. For example, the partition unit may initially partition a picture or slice into largest coding units LCUs, and partition each of the LCUs into sub-CUs based on rate-distortion analysis (e.g., rate-distortion optimization). The partitioning unit may further produce a quadtree data structure indicative of partitioning of an LCU into sub-CUs. Leaf-node CUs of the quadtree may include one or more PUs and one or more TUs.

The motion vector estimation unit 916 may execute a process of determining motion vectors for video blocks. A motion vector, for example, may indicate a displacement Dx,Dy of a prediction block (a prediction unit or PU) of a video block within a reference picture (or other coded unit) relative to the current block being coded within the current picture (or other coded unit). The motion estimation unit may compute a motion vector by comparing the position of the video block to the position of a prediction block of a reference picture that approximates the pixel values of the video block. Accordingly, in general, data for a motion vector may include a reference picture list (e.g. an (indexed) list of already decoded pictures (video frames) stored in the memory of the encoder apparatus), an index into the reference picture list, a horizontal (x) component and a vertical (y) component of the motion vector. The reference picture may be selected from one or more reference picture lists, e.g. a first reference picture list, a second reference picture list, or a combined reference picture list, each of which identify one or more reference pictures stored in reference picture memory 914.

The MV motion estimation unit 916 may generate and send a motion vector that identifies the prediction block of the reference picture to entropy encoding unit 912 and the inter-prediction unit 920. That is, motion estimation unit 916 may generate and send motion vector data that identifies a reference picture list containing the prediction block, an index into the reference picture list identifying the picture of the prediction block, and a horizontal and vertical component to locate the prediction block within the identified picture.

Instead of sending the actual motion vector, a motion vector prediction unit 922 may predict the motion vector to further reduce the amount of data needed to communicate the motion vector. In that case, rather than encoding and communicating the motion vector itself, the motion vector prediction unit 922 may generate a motion vector difference (MVD) relative to a known motion vector, a motion vector predictor MVP. The MVP may be used with the MVD to define the current motion vector. In general, to be a valid MVP, the motion vector being used for prediction points to the same reference picture as the motion vector currently being coded.

The motion vector prediction unit 922 may be configured to build a MVP candidate list that may include motion vectors associated with a plurality of already encoded blocks in spatial and/or temporal directions as candidates for a MVP. In an embodiment, the plurality of blocks may include blocks in the current video frame that are already decoded and/or blocks in one or more references frames, which are stored in the memory of the decoder apparatus. In an embodiment, the plurality of blocks may include neighbouring blocks, i.e. blocks neighbouring the current block in spatial and/or temporal directions, as candidates for a MVP. A neighbouring block may include a block directly neighbouring the current block or a block that is in the neighbourhood of the current block, e.g. within a few blocks distance.

When multiple MVP candidates are available (from multiple candidate blocks), MV prediction unit 922 may determine an MVP for a current block according to predetermined selection criteria. For example, MV prediction unit 922 may select the most accurate predictor from the candidate list based on analysis of encoding rate and distortion (e.g., using a rate-distortion cost analysis or other coding efficiency analysis). Other methods of selecting a motion vector predictor are also possible. Upon selecting an MVP, MV prediction unit may determine a MVP index, which may be used to inform a decoder apparatus where to locate the MVP in a reference picture list comprising MVP candidate blocks. MV prediction unit 922 may also determine the MVD between the current block and the selected MVP. The MVP index and MVD may be used to reconstruct the motion vector of a current block. Typically, the partition unit and mode selection unit (including the intra- and inter-prediction unit and the motion vector predictor unit) and the motion vector estimation unit may be highly integrated. These units are illustrated separately in the figures for conceptual purposes.

A residual video block may be formed by an adder 906 subtracting a predicted video block (as identified by a motion vector) received from mode select unit 904 from the original video block being coded. The transform processing unit 909 may be used to apply a transform, such as a discrete cosine transform (DCT) or a conceptually similar transform, to the residual video block to form a block of residual transform coefficient values. Transforms that are conceptually similar to DCT may include for example wavelet transforms, integer transforms, sub-band transforms, etc. The transform processing unit 909 applies the transform to the residual block, producing a transformed residual block. In an embodiment, the transformed residual block may comprise a block of residual transform coefficients. The transform may convert the residual information from a pixel value domain to a transform domain, such as a frequency domain. Transform processing unit 909 may send the resulting transform coefficients to a quantization unit 910, which quantizes the transform coefficients to further reduce bit rate.

A controller 917 may provide syntax elements (metadata) of the encoding process, such as inter-mode indicators, intra-mode indicators, partition information, and syntax information, to entropy coding unit 912. Here the syntax elements may include information for signalling (selected) motion vector predictors (for example an indication, e.g. an index in an indexed list, of the MVP candidate selected by the encoder), motion vector differences and metadata associated with the motion vector prediction process. The controller may control the encoding process based on an HRD model 911 which may define syntax elements, e.g. a flag that partial output is possible and/or picture timing SEI messages for timing of the partial output, that can be used for the generation of a bitstream 913 that is suitable for partial output. For example, during the encoding process, the encoder may insert parameters and/or messages, such as SEI messages, into the bitstream that enable a decoder apparatus to partially output decoded DUs that are stored in the DPB. Examples of such messages are described hereunder in more detail.

The entropy coding unit 912 entropy may be configured to encode the quantized transform coefficients and the syntax elements into bitstream 913. For example, entropy coding unit may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighbouring blocks. Following the entropy coding by entropy coding unit, the encoded bitstream may be transmitted to another device (e.g., a video decoder) or stored for later transmission or retrieval.

The inverse quantization and inverse transform unit 915 may be configured to apply an inverse quantization and inverse transformation, respectively, to reconstruct the residual block in the pixel domain, e.g., for later use as a reference block. Inter-prediction unit 920 may calculate a reference block by adding the residual block to a prediction block of one of the reference pictures that are stored in the decoded picture buffer 914. Inter-prediction unit 920 may also apply one or more interpolation filters to the reconstructed residual block to calculate sub-integer pixel values for use in motion estimation. The reconstructed residual block may be added to the motion prediction block produced by the inter-prediction unit 920 to produce a reconstructed video block for storage in the reference picture memory 914. The reconstructed video block may be used by motion vector estimation unit 916 and inter-prediction unit 920 as a reference block to inter-coding a block in a subsequent picture.

The encoder apparatus may perform a known rate-distortion optimisation (RDO) process in order to find the best coding parameters for coding blocks in a picture. Here, the best coding parameters (including mode decision (intra-prediction or inter-prediction); intra prediction mode estimation; motion estimation; and quantization) refer to the set of parameters that provide the best trade-off between a number of bits used for encoding a block versus the distortion that is introduced by using the number of bits for encoding.

The term rate-distortion optimisation is sometimes also referred to as RD optimization or simply "RDO". RDO schemes that are suitable for AVC and HEVC type coding standards are known as such, see for example, Sze et al. "*High efficiency video coding (HEVC)*." Integrated Circuit and Systems, Algorithms and Architectures. Springer (2014): 1-375; Section: 9.2.7 RD Optimization. RDO can be implemented in many ways. In one well-known implementation, the RDO problem can be expressed as a minimization of a Lagrangian cost function J with respect to a Lagrangian multiplier:

$$\lambda :: \min_{(coding\ parameters)} J = (D + \lambda * R).$$

Here, the parameter R represents the rate (i.e. the number of bits required for coding) and the parameter D represents the distortion of the video signal that is associated with a certain rate R. The distortion D may be regarded a measure of the video quality. Known metrics for objectively determining the quality (objectively in the sense that the metric is content agnostic) include means-squared error (MSE), peak-signal-to-noise (PSNR) and sum of absolute differences (SAD).

In the context of HEVC, the rate-distortion cost may require that the encoder apparatus computes a predicted video block using each or at least part of the available prediction modes, i.e. one or more intra-prediction modes and/or one or more inter-prediction modes. The encoder apparatus may then determine a difference video signal between each of the predicted blocks and the current block (here the difference signal may include a residual video block) and transforms each residual video block of the determined residual video blocks from the spatial domain to the frequency domain into a transformed residual block. Next, the encoder apparatus may quantize each of the transformed residual blocks to generate corresponding encoded video blocks. The encoder apparatus may decode the encoded video blocks and compare each of the decoded video blocks with the current block to determine a distortion metric D. Moreover, the rate-distortion analysis may involve computing the rate R for each encoded video block associated with of one of the prediction modes, wherein the rate R includes a number of bits used to signal an encoded video block. The thus determined RD costs, the distortion D and the rate R of the encoded blocks for each of the prediction modes, are then used to select an encoded video block that provides the best trade-off between the number of bits used for encoding the block versus the distortion that is introduced by using the number of bits for encoding.

Based on a video encoder apparatus a coded video streams of at least a high- and low-resolution version of a video may be prepared. Here, the lower resolution version may be prepared by coding a subsampled version of a high-resolution version, wherein the subsampling is based on one of a plurality subsampling lattices of a spatial subsampling scheme, such as the polyphase subsampling scheme or an equivalent thereof. Further, the other subsampling lattices of the spatial subsampling scheme may be used to generate coded auxiliary pictures for pictures of the low-resolution video. The coded low- and high-resolution versions may be stored at a content source, e.g. a server system for distributing, e.g. streaming, the video to clients, typically video streaming clients. A streaming session may be set up between the content source and the client to enable transmission of content based on the high- or low-resolution video.

To achieve switching between the high and low resolution streams, a bitstream construction module may be configured to construct a bitstream comprising a resolution change as described with reference to the embodiments in this application. Depending on the implementation, the bitstream construction module may be located at the content source, somewhere in the network between the content source and the client or at the client. The module may be configured to receive at its input both a coded version of the high- and low-resolution version of a video and to construct a bitstream comprising a resolution change, including a signalling message and one or more auxiliary pictures. To that end, the module may have access to auxiliary pictures, which may be generated by the source and provided to the module. Alternatively, the bitstream construction module may be configured to generate the auxiliary pictures. The bitstream comprising the resolution change may be subsequently transmitted to the decoder, which is configured to process such resolution change and to decode the coded pictures into decoded pictures which can be rendered by rendering engine on a display.

Figure 10A:
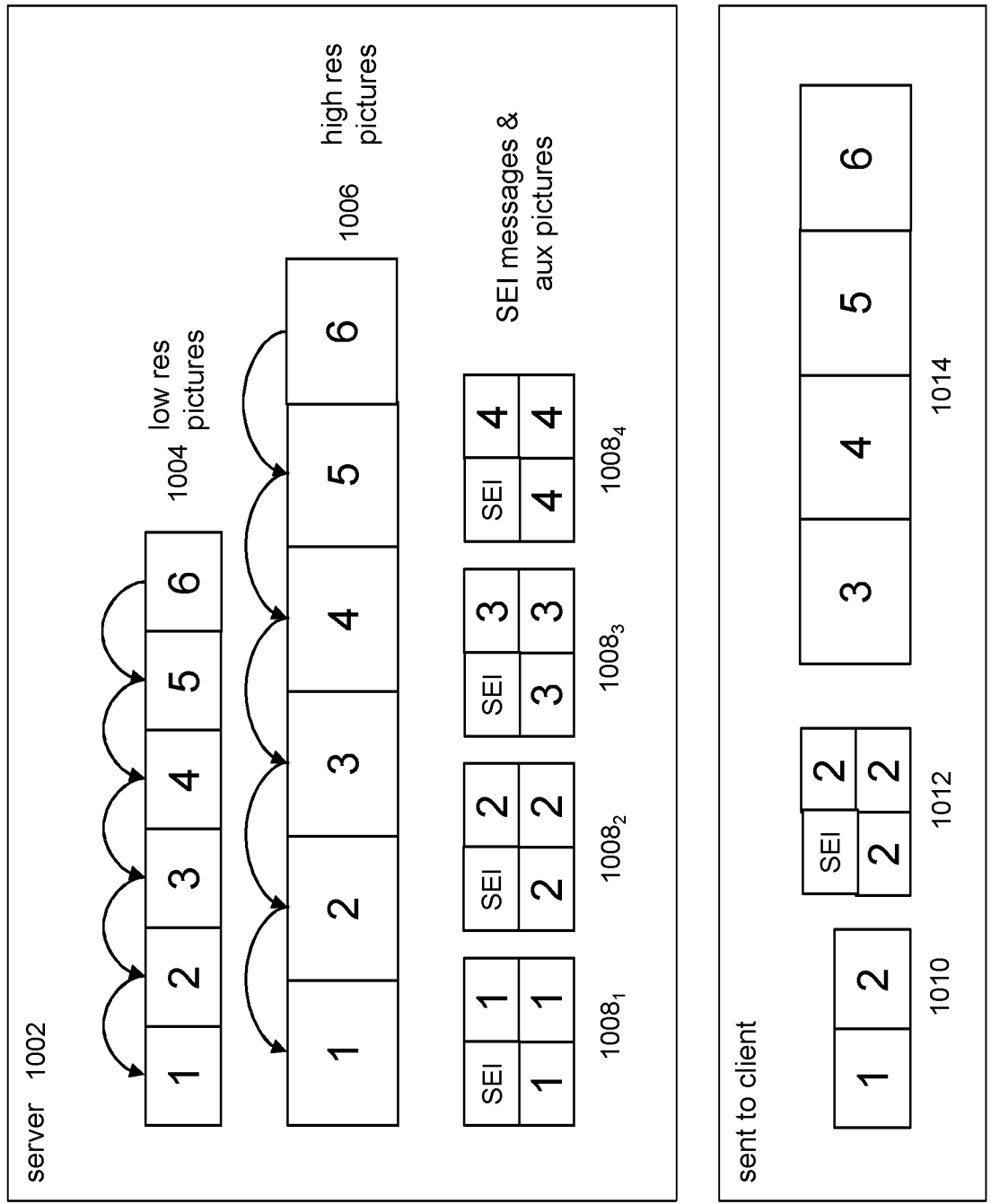
FIGS. 10A and 10B depict examples of constructing of the bitstream by a bitstream construction module according to an embodiment of the invention.
Figure 10B:
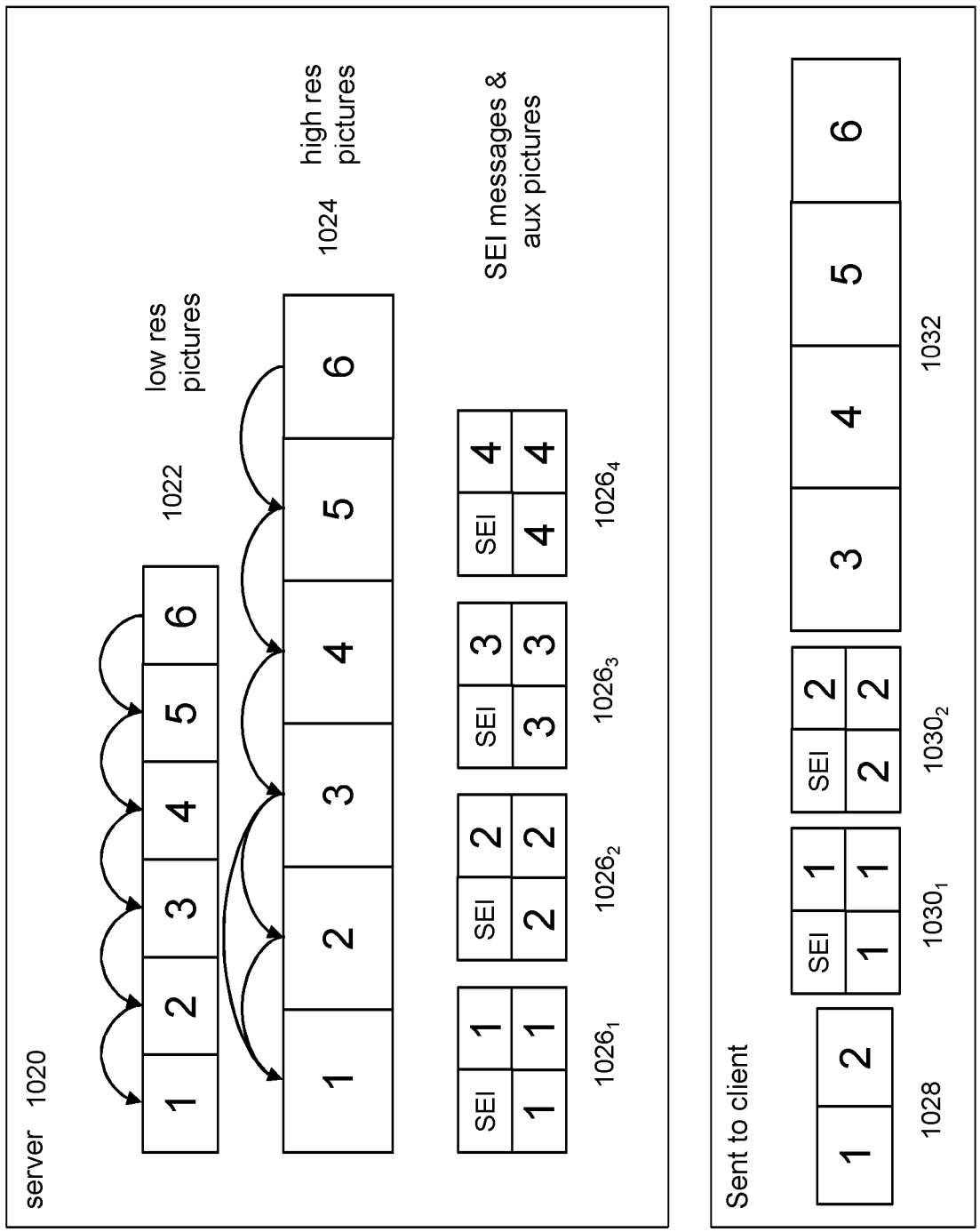

FIGS. 10A and 10B depict examples of constructing of the bitstream by a bitstream construction module according to an embodiment of the invention. In particular, FIG. 10A a server 1002 comprising a bitstream construction module for constructing a bitstream comprising both low-resolution pictures 1004, high high-resolution pictures 1006 and a SEI messages $1008_{1-4}$ comprising signalling information and auxiliary pictures as described with reference to the embodiments in this application. During streaming a client (or a server) may decide to switch to a high resolution version. At low resolution picture 2 1010, a SEI message 1012 comprising auxiliary pictures for picture 2 may be sent to the decoder which decodes the pictures accordingly, ending up with an upscaled picture 2 that can then serve as a reference for picture 3 and eventually other pictures 1014 in the high resolution, although this is not necessary in with the GOP structure indicated in 1006.

The decision to switch can be at client or server. In the case that it is the client, it may request the server to initiate a resolution change, e.g. go to a higher quality. In response, the client may receive metadata, e.g. one or more SEI messages, from the server which is aware of the GOP structure. Similarly, the server may decide when to switch and pushes the correct auxiliary pictures to the client.

FIG. 10B depicts a server 1020 comprising a bitstream construction module for constructing a bitstream comprising both low-resolution pictures 1022, high-resolution pictures 1024 and a SEI messages $1026_{1-4}$ comprising signalling information and auxiliary pictures as described with reference to the embodiments in this application. In this embodiment, however the GOP structures of the high- and low-resolution streams are different. As before, the server 1020 knows the GOP structures of both streams because it has access to all the data. During streaming, the server can parse the two bitstreams (low resolution stream 1022 and high-resolution stream 1024) and determine that if a client were to switch at picture 2, it would not only to upscale picture 2, but also picture 1, since in the high-resolution stream it is used as a reference for future pictures—namely picture 3. Hence, in that case the server would therefore send the client two sets of auxiliary pictures, one for picture 1 and one for picture 2 to upscale and form reference pictures for decoding some of the high resolution pictures 1032. The server would also have to guarantee that the client still has picture 1 in its buffer—something that would be possible as it has access to all the coded data. Hence the server would need to guarantee frame dependencies and then decide what needs to be sent to the client.

Figure 11:
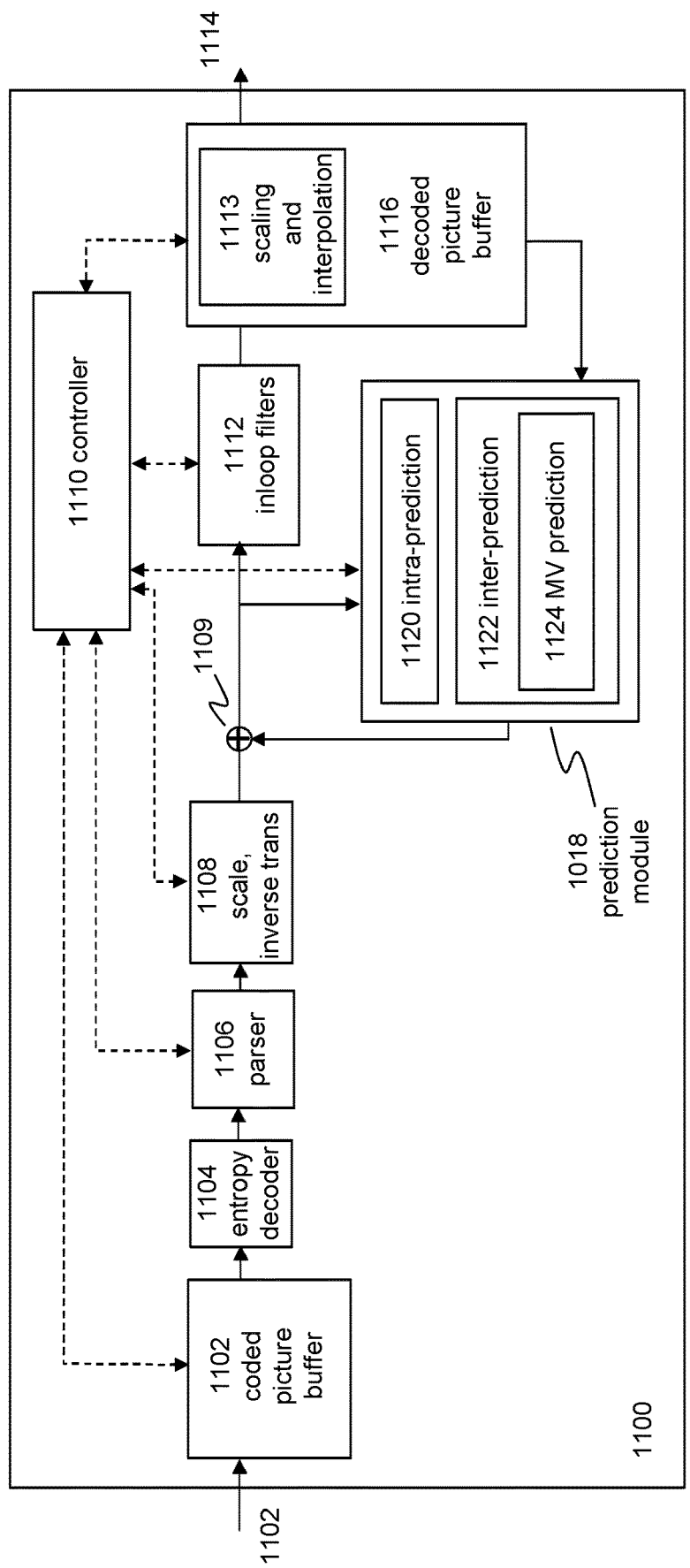
FIG. 11 depicts a decoder apparatus according to an embodiment of the invention.

FIG. 11 is a block diagram illustrating a video decoder apparatus 1100 comprising a motion vector prediction unit according to an embodiment of the invention. The video decoder apparatus, or in short, decoder apparatus, may be configured to decode a bitstream comprising encoded video data as generated by a video encoder apparatus as described with reference to FIG. 9.

In the example of FIG. 11, video decoder apparatus 1100 may include entropy decoding unit 1104, parser 1106, prediction unit 1118, inverse quantization and inverse transformation unit 1108, summer 1109, controller 1110, a scaling module 1113 and a decoded picture buffer 1016 for storing decoded information, including reference pictures that are used in the decoding process. Here, prediction unit 1118 may include an inter-prediction unit 1122 and intra-prediction unit 1120. Further, the inter-prediction unit may include a motion vector prediction unit 1124.

Similar to the motion vector predictor unit of the encoder apparatus of FIG. 9, the motion vector prediction unit of the decoder may be configured to build a MVP candidate list that may include motion vectors of a plurality of blocks, including blocks, such as neighbouring blocks, in the current video frame that are already decoded and/or blocks in one or more references frames, which are stored in the decoded picture buffer.

Decoder apparatus 1100 may be configured to receive an encoded video bitstream 1102 that comprises encoded decoding units, e.g. encoded video blocks and associated syntax elements from a video encoder. Entropy decoding unit 1104 decodes the bitstream to generate transformed decoded residual blocks (e.g. quantized coefficients associated with residual blocks), motion vector differences, and syntax elements (metadata) for enabling the video decoder to decode the bitstream.

Parser unit 1106 forwards the motion vector differences and associated syntax elements to prediction unit 1118. The syntax elements may be received at video slice level and/or video block level. For example, video decoder 1100 may receive compressed video data that has been compressed for transmission via a network into so-called network abstraction layer (NAL) units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to as NAL unit is referred to as non-VCL data, which includes additional information such as parameter sets that define header data common to a large number of NAL units and supplemental enhancement information (SEI) messages. The controlling of the decoding process may be based on metadata in the NAL units, in particular signalling messages, such as non-VCL NAL units, including SEI messages or messages that are similar or equivalent to such messages. These signalling messages may include syntax elements for controlling resolution changes during the decoding process as described with reference to the embodiments in this disclosure.

When video blocks of a video frame are intra-coded (I), intra-prediction unit 1120 of prediction unit 1118 may generate prediction data for a video block of the current video slice based on a signalled intra-prediction mode and data from previously decoded blocks of the current picture. When video blocks of a video frame are inter-coded (e.g. B or P), inter-prediction unit 1122 of prediction unit 1118 may produces prediction blocks for a video block of the current video slice based on motion vector differences and other syntax elements received from entropy decoding unit 1104. The prediction blocks may be produced from one or more of the reference pictures within one or more of the reference picture lists stored in the memory of the video decoder. The video decoder may construct the reference picture lists, using default construction techniques based on reference pictures stored in reference picture memory 1116.

Inter-prediction unit 1120 may determine prediction information for a video block of the current video slice by parsing the motion vector differences and other syntax elements and using the prediction information to produce prediction blocks for the current video block being decoded. For example, inter-prediction unit 1120 uses some of the received syntax elements to determine a prediction mode (e.g., intra- or inter-prediction) which was used to code the video blocks of the video slice, an inter-prediction slice type (e.g., B slice or a P slice), construction information for one or more of the reference picture lists for the slice, motion vector predictors for each inter-encoded video block of the slice, inter-prediction status for each inter-coded video block of the slice, and other information to decode the video blocks in the current video slice. In some examples, inter-prediction unit 1020 may receive certain motion information from motion vector prediction unit 1124.

The decoder apparatus may retrieve a motion vector difference MVD and an associated encoded block representing a current block that needs to be decoded. In order to determine a motion vector based on the MVD, the motion vector prediction unit 1124 may determine a candidate list of motion vector predictor candidates associated with a current block. The motion vector predictor unit 1124 may be configured to build a list of motion vector predictors in the same way as done by the motion vector predictor unit in the encoder.

The motion vector prediction algorithm may evaluate motion vector predictor candidates which are associated with blocks in the current frame or a reference frame that have a predetermined position (typically neighbouring) relative to the position of the current block. These relative positions are known to the encoder and the decoder apparatus. Thereafter, the motion vector prediction unit may select a motion vector predictor MVP from the list of motion vector prediction candidates based on the indication of the selected motion vector predictor candidate which was transmitted in the bitstream to decoder. Based on the MVP and the MVD the inter-prediction unit may determine a prediction block for the current block.

Inverse quantization and inverse transform unit 1108 may inverse quantize, i.e., de-quantizes, the quantized transform coefficients provided in the bitstream and decoded by entropy decoding unit. The inverse quantization process may include the use of a quantization parameter calculated by video encoder for each video block in the video slice to determine a degree of quantization and, likewise, a degree of inverse quantization to be applied. It may further apply an inverse transform, e.g., an inverse DCT, an inverse integer transform, or a conceptually similar inverse transform process, to the transform coefficients in order to produce residual blocks in the pixel domain.

After the inter-prediction unit 1120 has generated the prediction block for the current video block, the video decoder may form a decoded video block by summing a residual block with the corresponding prediction block. The adder 1109 represents the component or components that perform this summation operation. If desired, a deblocking filter may also be applied to filter the decoded blocks to remove blocking artefacts. Other loop filters (either in the coding loop or after the coding loop) may also be used to smooth pixel transitions, or otherwise improve the video quality. The decoded video blocks in a given picture are then stored in a coded picture buffer 1116, which stores reference pictures which may be used for subsequent coding of further current blocks. The coded picture buffer 1116 may also store decoded video for later presentation on a display device.

When a decoder receives a signalling message informing the decoder that a resolution change is required, the decoder will use the information in the signalling message to execute the process of a resolution change. To that end, the controller controls the scaling and interpolation module 1113 for constructing one or more high resolution reference frames that are needed for decoding. Thus, during decoding decoded pictures will be temporarily stored in the DPB until the picture is output. Pictures that are needed as reference pictures will be stored in the DPB until they are no longer needed as reference pictures. If a resolution change is triggered by a signalling message, the controller will control the scaling and interpolation module to upscale a base picture. Thereafter, coded auxiliary pictures are decoded and used by the scaling and interpolation module to construct a high resolution reference picture that is needed for decoding one or more coded high resolution pictures that follow.

Figure 12:
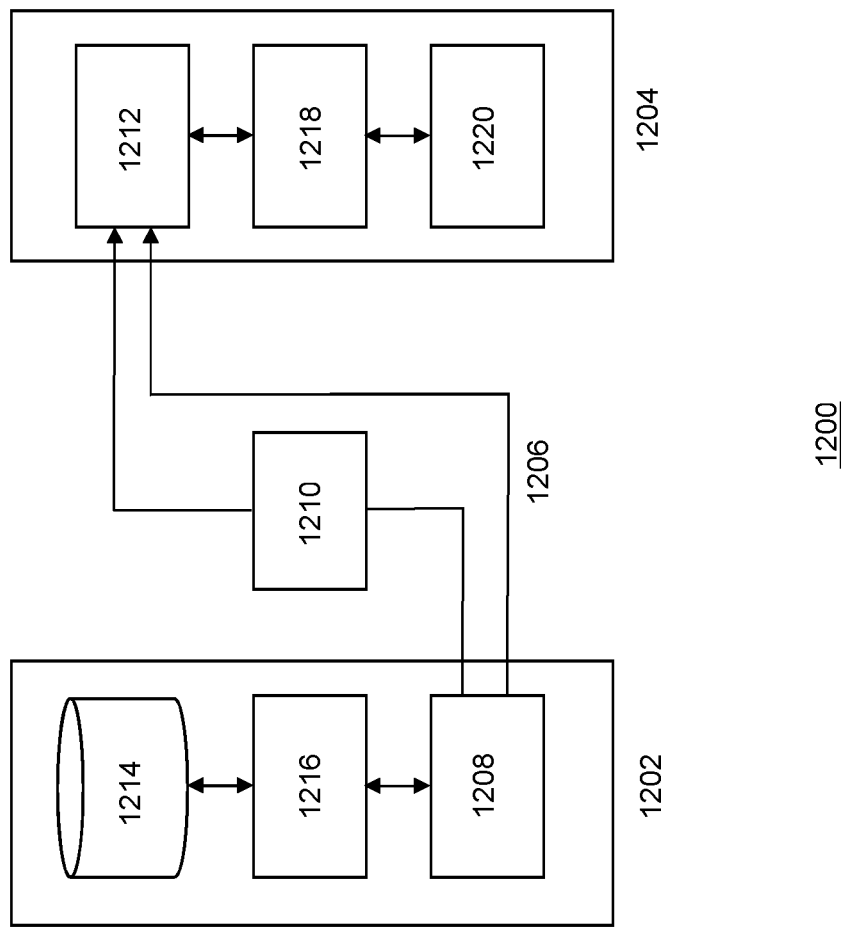
FIG. 12 depicts a block diagram illustrating an exemplary data processing system that may be used with embodiments described in this disclosure.

FIG. 12 depicts a schematic of a video encoding and decoding system 1200 that may use the techniques described in this application. As shown in FIG. 12, system 1200 may include a first video processing device 1202, e.g. a video capturing device or the like, configured to generate encoded video data which may be decoded by a second video processing device 1204, e.g. a video playout device. First and second video processing devices may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the video processing devices may be equipped for wireless communication.

The second video processing device may receive the encoded video data to be decoded through a transmission channel 1206 or any type of medium or device capable of moving the encoded video data from the first video processing device to the second video processing device. In one example, the transmission channel may include a communication medium to enable the first video processing device to transmit encoded video data directly to the second video processing device in real-time. The encoded video data may be transmitted based on a communication standard, such as a wireless communication protocol, to the second video processing device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, servers or any other equipment that may be useful to facilitate communication between first and second video processing devices.

Alternatively, encoded data may be sent via an I/O interface 1208 of the first video processing device to a storage device 1210. Encoded data may be accessed by input an I/O interface 1212 of the second video processing device.

Storage device 1210 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may hold the encoded video generated by the first video processing device. The second video processing device may access stored video data from storage device via streaming or downloading. The file server may be any type of server capable of storing encoded video data and transmitting that encoded video data to the second video processing device. Example file servers include a web server (e.g., for a website), an FTP server, network attached storage (NAS) devices, or a local disk drive. The second video processing device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 1210 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 1200 may be configured to support one-way or two-way video transmission to support applications such as video streaming, video playback, video broadcasting, and/or video telephony.

In the example of FIG. 12, the first video processing device may further include a video source 1214 and a video encoder 1216. In some cases, I/O interface 1208 may include a modulator/demodulator (modem) and/or a transmitter. The video source may include any type of source such as a video capture device, e.g., a video camera, a video archive containing previously captured video, a video feed interface to receive video from a video content provider, and/or a computer graphics system for generating computer graphics data as the source video, or a combination of such sources. If video source 1214 is a video camera, the first and second video processing device may form so-called camera phones or video phones. However, the techniques described in this disclosure may be applicable to video coding in general, and may be applied to wireless and/or wired applications.

The captured, pre-captured, or computer-generated video may be encoded by video encoder 1216. The encoded video data may be transmitted directly to the second video processing device via I/O interface 1208. The encoded video data may also (or alternatively) be stored onto storage device 1210 for later access by the second video processing device or other devices, for decoding and/or playback.

The second video processing device may further comprise a video decoder 1218, and a display device 1220. In some cases, I/O interface 1212 may include a receiver and/or a modem. I/O interface 1212 of the second video processing device may receive the encoded video data. The encoded video data communicated over the communication channel, or provided on storage device 1210, may include a variety of syntax elements generated by video encoder 1216 for use by a video decoder, such as video decoder 1218, in decoding the video data. Such syntax elements may be included with the encoded video data transmitted on a communication medium, stored on a storage medium, or stored a file server.

Display device 1220 may be integrated with, or external to, the second video processing device. In some examples, second video processing device may include an integrated display device and also be configured to interface with an external display device. In other examples, second video processing device may be a display device. In general, display device displays the decoded video data to a user, and may comprise any of a variety of display devices such as a liquid crystal display (LCD), a plasma display, an organic light emitting diode (OLED) display, or another type of display device.

Video encoder 1216 and video decoder 1218 may operate according to a video compression standard, such as the High Efficiency Video Coding (HEVC), VP9, AV1 or VVC. Alternatively, video encoder 1216 and video decoder 1118 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard.

Although not shown in FIG. 12, in some aspects, video encoder 1216 and video decoder 1218 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 1216 and video decoder 1218 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 1216 and video decoder 1218 may be included in one or more encoders or decoders, either of which may be integrated as part of a combined encoder/decoder (CODEC) in a respective device.

This disclosure may generally refer to video encoder "signalling" certain information to another device, such as video decoder. The term "signalling" may generally refer to the communication of syntax elements and/or other data (metadata) used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Method of decoding encoded representations of pictures of a first and second resolution version of a video by a decoder apparatus, the method including:
   receiving a bitstream comprising encoded representations of first pictures of the first resolution version, each of the first pictures being a first spatially subsampled version of a corresponding second picture of the second resolution version, the subsampling being based on a first sampling lattice selected from a plurality of sampling lattices of a spatial subsampling scheme;
   decoding the encoded representations of the first pictures into first pictures;
   receiving signalling information, the signalling information informing the decoder apparatus about a termination of receiving the encoded representations of the first pictures and the start of receiving of encoded representations of second pictures of the second resolution version,
   the signalling information further identifying at least one of the first pictures of the first resolution version as a first base picture and selecting one or more auxiliary pictures, the first base picture being associated with a corresponding second picture of the second resolution version, and, each of the one or more auxiliary pictures being a second spatially subsampled version of the corresponding second picture of the second resolution version, the subsampling being based on one or more further sampling lattices of the plurality of sampling lattices of the spatial subsampling scheme;
   receiving an encoded representation of the one or more auxiliary pictures in the bitstream, decoding the encoded representation of the one or more auxiliary pictures into one or more auxiliary pictures and constructing a reference picture of the second resolution version based on the first base picture and the one or more auxiliary pictures; and,
   receiving an encoded representation of second pictures in the bitstream and decoding at least part of the encoded representation of the second pictures into one or more second pictures using the reference picture.

2. Method according to claim 1 wherein the signalling information and, optionally, the one or more auxiliary pictures, is contained in one or more signalling messages, preferably one or more NAL units, such as one or more supplemental enhancement information, SEI, messages, one or more Open Bitstream Units, OBUs, or one or more messages equivalent to such SEI or OBU messages.

3. Method according to claim 2, wherein one or more signaling messages comprise at least one identifier, for example a frame number, identifying the first base picture in the sequence of coded first pictures.

4. Method according to claim 1 wherein the first pictures have a first resolution and the second pictures have a second resolution, the signaling information including: information about the second resolution and/or information about the identity of one or more VCL NAL units comprising a coded representation of the one or more auxiliary pictures.

5. Method according to claim 1 wherein the signaling information further comprises information for constructing the reference picture, preferably information associated with the sampling lattices that were used to form the base picture and the one or more auxiliary pictures and/or information associated with an interpolation filter for interpolating pixels values for the reference picture.

6. Method according to claim 1 wherein the constructing of the reference picture includes:
   upscaling the base picture and the one or more auxiliary pictures to an upscaled base picture and one or more upscaled auxiliary picture respectively, the upscaling being based on the sampling lattices of the spatial subsampling scheme;
   summing the upscaled base picture and the one or more upscaled auxiliary pictures into a summed picture.

7. Method according to claim 1, wherein the encoded representation of the one or more auxiliary pictures is computed using the base picture as a reference frame for at least one of the one or more auxiliary pictures.

8. Method according to claim 1, wherein a sampling lattice defining pixels of a second picture is selected to form the first picture.

9. Method according to claim 1 wherein the decoding is based on a coding standard, preferably a block-based video coding standard, more preferably an AVC, HEVC, VP9, AV1, VVC coding standard or a coding standard based on of the AVC, HEVC, VP9, AV1, VVC coding standards.

10. Method of transmitting a bitstream comprising encoded representations of pictures of a first and second resolution version of a video to a device, the method comprising:
    transmitting a bitstream to the device, the bitstream comprising an encoded representation of first pictures of the first resolution version, the device comprising a decoder apparatus for decoding the encoded representation of first pictures into first pictures, the first pictures being associated with corresponding second pictures of the second resolution version of the video, each of the first pictures being a first spatially subsampled version of a corresponding second picture of the second resolution version, the subsampling being based on a first sampling lattice selected from a plurality of sampling lattices of a spatial subsampling scheme;

transmitting signalling information to the device, the signalling information informing the decoder apparatus about a termination of receiving the encoded representations of the first pictures and the start of receiving of encoded representations of second pictures of the second resolution version, the signalling information further identifying at least one of the first pictures of the first resolution version as a first base picture and identifying one or more auxiliary pictures, the first base picture being associated with a corresponding second picture of the second resolution version, and, each of the one or more auxiliary pictures being a second spatially subsampled version of the corresponding second picture of the second resolution version, the subsampling being based on one or more further sampling lattices of the plurality of sampling lattices of the spatial subsampling scheme;

transmitting an encoded representation of the one or more auxiliary pictures in the bitstream to the device for the decoder apparatus to decode the encoded representation of the one or more auxiliary pictures into one or more auxiliary pictures and construct a reference picture of the second resolution version based on the first base picture and the one or more auxiliary pictures; and, transmitting an encoded representation of second pictures in the bitstream to the device for decoding at least part of the encoded representation of the second pictures into one or more second pictures based on the reference picture.

11. A decoder apparatus for decoding encoded representations of pictures of a first and second resolution version of a video, the decoder apparatus comprising:

a computer readable storage medium having computer readable program code embodied therewith, and a processor coupled to the computer readable storage medium, wherein responsive to executing the computer readable program code, the processor is configured to perform executable operations comprising:

receiving a bitstream comprising encoded representations of first pictures of the first resolution version, each of the first pictures being a first spatially subsampled version of a corresponding second picture of the second resolution version, the subsampling being based on a first sampling lattice selected from a plurality of sampling lattices of a spatial subsampling scheme;

decoding the encoded representations of the first pictures into first pictures;

receiving signalling information, the signalling information informing the decoder apparatus about a termination of receiving the encoded representations of the first pictures and the start of receiving of encoded representations of second pictures of the second resolution version, the signalling information further identifying at least one of the first pictures of the first resolution version as a first base picture and identifying one or more auxiliary pictures, the first base picture being associated with a corresponding second picture of the second resolution version, and, each of the one or more auxiliary pictures being a second spatially subsampled version of the corresponding second picture of the second resolution version, the subsampling being based on one or more further sampling lattices of the plurality of sampling lattices of the spatial subsampling scheme;

receiving an encoded representation of the one or more auxiliary pictures in the bitstream, decoding the encoded representation of the one or more auxiliary pictures into one or more auxiliary pictures and constructing a reference picture of the second resolution version based on the first base picture and the one or more auxiliary pictures; and, receiving an encoded representation of second pictures in the bitstream and decoding at least part of the encoded representation of the second pictures into one or more second pictures using the reference picture.

12. Decoder apparatus according to claim 11 wherein the signaling information and, optionally, the one or more auxiliary pictures, is contained in one or more signaling messages, preferably one or more NAL units, such as one or more supplemental enhancement information, SEI, messages, one or more Open Bitstream Units, OBUs, or one or more messages equivalent to such SEI or OBU messages.

13. Decoder apparatus according to claim 11 wherein the signaling information includes: information about the resolution to which the decoding process is going to change and/or information about the identity of one or more VCL NAL units comprising a coded representation of the one or more auxiliary pictures; and/or, information for constructing the reference picture, preferably information associated with the sampling lattices that were used to form the base picture and the one or more auxiliary pictures and/or information associated with an interpolation filter for interpolating pixels values for the reference picture.

14. A video transmission module for transmitting a bitstream comprising encoded representations of pictures of a first and second resolution version of a video to a device, the video transmission module comprising:

a computer readable storage medium having computer readable program code embodied therewith, and a processor coupled to the computer readable storage medium, wherein responsive to executing the computer readable program code, the processor is configured to perform executable operations comprising:

transmitting a bitstream to the device, the bitstream comprising an encoded representation of first pictures of the first resolution version, the device comprising a decoder apparatus for decoding the encoded representation of first pictures into first pictures, the first pictures being associated with corresponding second pictures of the second resolution version of the video, each of the first pictures being a first spatially subsampled version of a corresponding second picture of the second resolution version, the subsampling being based on a first sampling lattice selected from a plurality of sampling lattices of a spatial subsampling scheme;

transmitting signalling information to the device, the signalling information informing the decoder apparatus about a termination of receiving the encoded representations of the first pictures and the start of receiving of encoded representations of second pictures of the second resolution version, the signalling information further identifying at least one of the first pictures of the first resolution version as a first base picture and identifying one or more auxiliary pictures, the first base picture being associated with a corresponding second picture of the second resolution version, and, each of the one or more auxiliary pictures being a second spatially subsampled version of the corresponding second picture of the second resolution version, the subsampling being based on one or more further sampling lattices of the plurality of sampling lattices of the spatial subsampling scheme;

transmitting an encoded representation of the one or more auxiliary pictures in the bitstream to the device for the decoder apparatus to decode the encoded representation of the one or more auxiliary pictures into one or more auxiliary pictures and construct a reference picture of the second resolution version based on the first base picture and the one or more auxiliary pictures; and, transmitting an encoded representation of second pictures in the bitstream to the device for decoding at least part of the encoded representation of the second pictures into one or more second pictures based on the reference picture.

15. A bitstream construction module comprising:

a computer readable storage medium having computer readable program code embodied therewith, and a processor coupled to the computer readable storage medium, wherein responsive to executing the computer readable program code, the processor is configured to perform executable operations comprising:

constructing a bitstream comprising encoded representations of pictures of a first and second resolution version of a video, the bitstream comprising a resolution change from an encoded representation of first pictures of the first resolution version of the video to an encoded representation of second pictures of the second resolution version of the video; and, transmitting the bitstream to a decoder apparatus, wherein the bitstream comprises:

an encoded representation of the first pictures, the first pictures being associated with corresponding second pictures of the second resolution version of the video, each of the first pictures being a first spatially subsampled version of a corresponding second picture of the second resolution version, the subsampling being based on a first sampling lattice selected from a plurality of sampling lattices of a spatial subsampling scheme;

signalling information for informing a decoder apparatus about a termination of receiving the encoded representations of the first pictures and the start of receiving of encoded representations of second pictures of the second resolution version, the signalling information further identifying at least one of the first pictures of the first resolution version as a first base picture and identifying one or more auxiliary pictures, the first base picture being associated with a corresponding second picture of the second resolution version, and, each of the one or more auxiliary pictures being a second spatially subsampled version of the corresponding second picture of the second resolution version, the subsampling being based on one or more further sampling lattices of the plurality of sampling lattices of the spatial subsampling scheme;

an encoded representation of the one or more auxiliary pictures for the decoder apparatus to decode the encoded representation of the one or more auxiliary pictures into one or more auxiliary pictures and construct a reference picture of the second resolution version based on the first base picture and the one or more auxiliary pictures; and, an encoded representation of second pictures wherein at least part of the encoded representation of the second pictures can be decoded by the decoder apparatus into one or more second pictures based on the reference picture.

16. Computer program product comprising software code portions configured for, when run in the memory of a computer, executing the method steps according to claim 1.

* * * * *